US010716161B2

(12) United States Patent
Ryu et al.

(10) Patent No.: US 10,716,161 B2
(45) Date of Patent: Jul. 14, 2020

(54) METHOD FOR RESUMING CONNECTION IN WIRELESS COMMUNICATION SYSTEM AND DEVICE FOR SAME

(71) Applicant: LG ELECTRONICS INC., Seoul (KR)

(72) Inventors: Jinsook Ryu, Seoul (KR); Daewook Byun, Seoul (KR)

(73) Assignee: LG Electronics Inc., Seoul (KR)

(*) Notice: Subject to any disclaimer, the term of this patent is extended or adjusted under 35 U.S.C. 154(b) by 1 day.

(21) Appl. No.: 16/071,474

(22) PCT Filed: Jan. 19, 2017

(86) PCT No.: PCT/KR2017/000692
§ 371 (c)(1),
(2) Date: Jul. 19, 2018

(87) PCT Pub. No.: WO2017/126922
PCT Pub. Date: Jul. 27, 2017

(65) Prior Publication Data
US 2019/0037629 A1    Jan. 31, 2019

Related U.S. Application Data

(60) Provisional application No. 62/296,076, filed on Feb. 17, 2016, provisional application No. 62/290,968, (Continued)

(51) Int. Cl.
H04W 76/19    (2018.01)
H04W 76/10    (2018.01)
(Continued)

(52) U.S. Cl.
CPC ............. *H04W 76/19* (2018.02); *H04W 8/08* (2013.01); *H04W 76/10* (2018.02); *H04W 76/27* (2018.02); *H04W 76/28* (2018.02); *H04W 88/16* (2013.01)

(58) Field of Classification Search
None
See application file for complete search history.

(56) References Cited

U.S. PATENT DOCUMENTS

2013/0183971 A1* 7/2013 Tamaki ............. H04W 36/0061
                                                   455/436
2013/0260810 A1* 10/2013 Rayavarapu .......... H04W 76/19
                                                   455/509
(Continued)

FOREIGN PATENT DOCUMENTS

EP    2557889    2/2013
EP    3399831    11/2018
(Continued)

OTHER PUBLICATIONS

European Patent Office Application Serial No. 17741688.0, Search Report dated May 23, 2019, 12 pages.
(Continued)

Primary Examiner — Lonnie V Sweet
(74) Attorney, Agent, or Firm — Lee Hong Degerman Kang Waimey

(57) ABSTRACT

Disclosed are a method for resuming a connection in a wireless communication system and a device for same. More particularly, a method for executing a procedure of resuming a connection by a network node in a wireless communication system can comprise the steps of: receiving a message, which comprises a tracking area update request (TAU request) of a user equipment (UE), from an eNodeB (eNB), wherein the message comprises a result that determines the validity with regard to whether or not resumption
(Continued)

of a connection of the UE is possible by means of the eNB; determining whether or not an E-UTRAN radio access bearer (E-RAB) setup for the UE is required; and determining a message to be transmitted to the eNB on the basis of whether or not the E-RAB setup for the UE is required and/or whether or not resumption of a connection of the UE is possible.

14 Claims, 23 Drawing Sheets

Related U.S. Application Data filed on Feb. 4, 2016, provisional application No. 62/280,130, filed on Jan. 19, 2016.

(51) Int. Cl.
  *H04W 76/28* (2018.01)
  *H04W 76/27* (2018.01)
  *H04W 88/16* (2009.01)
  *H04W 8/08* (2009.01)

(56) References Cited

U.S. PATENT DOCUMENTS

| | | | |
|---|---|---|---|
| 2013/0308527 A1 | 11/2013 | Chin et al. | |
| 2014/0016614 A1 | 1/2014 | Velev et al. | |
| 2018/0035420 A1* | 2/2018 | Centonza | H04W 72/048 |
| 2019/0021128 A1* | 1/2019 | Sivavakeesar | H04W 4/70 |

FOREIGN PATENT DOCUMENTS

| | | |
|---|---|---|
| KR | 20160003021 | 1/2016 |
| WO | 2014058245 | 4/2014 |

OTHER PUBLICATIONS

LG Electronics, "Discussion on UL data transmission during TAU", 3GPP TSG RAN WG3 Meeting Ad Hoc, R3-160062, XP051067101, Jan. 2016, 3 pages.
Alcatel-Lucent, et al., "Introduction in TS 36.413 of the cIOT User Plane Solution", 3GPP TSG RAN WG3 Meeting Ad-hoc NB-IOT, R3-160105, XP051067057, Jan. 2016, 3 pages.
Samsung, "The resume of the UE bearer", 3GPP TSG RAN WG2 Meeting Ad Hoc, R3-160030, XP051067074, Jan. 2016, 3 pages.
PCT International Application No. PCT/KR2017/000692, International Search Report dated May 8, 2017, 16 pages.
Samsung, "The resume of the UE bearer," 3GPP TSG-RAN WG3 #Ad Hoc, R3-160030, Jan. 2016, 5 pages.

\* cited by examiner

[FIG. 1]
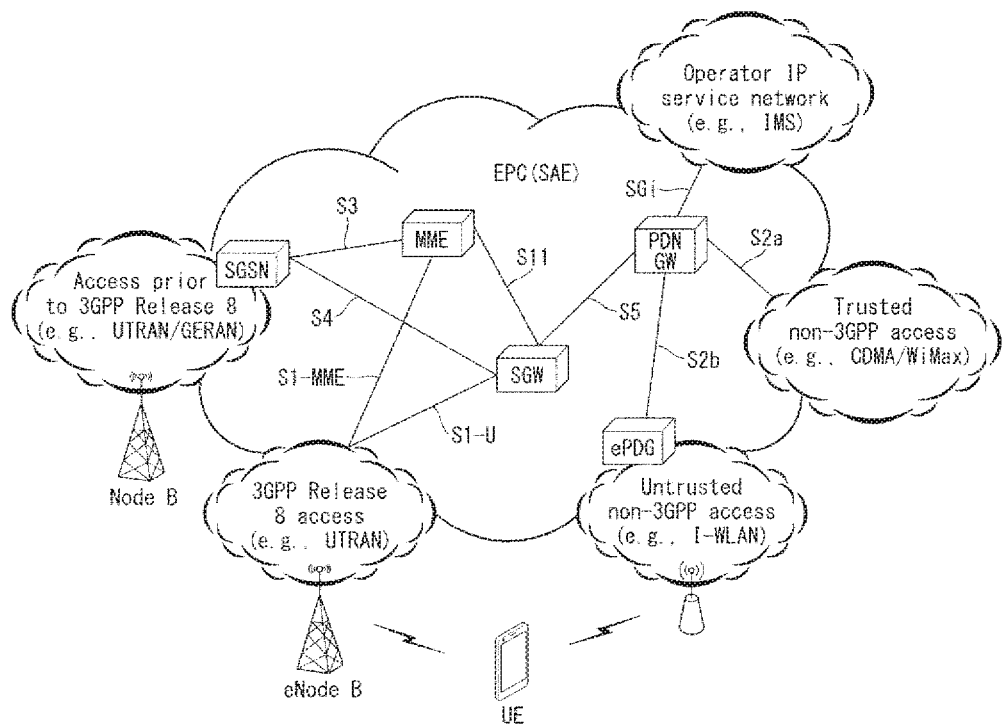

[FIG. 2]
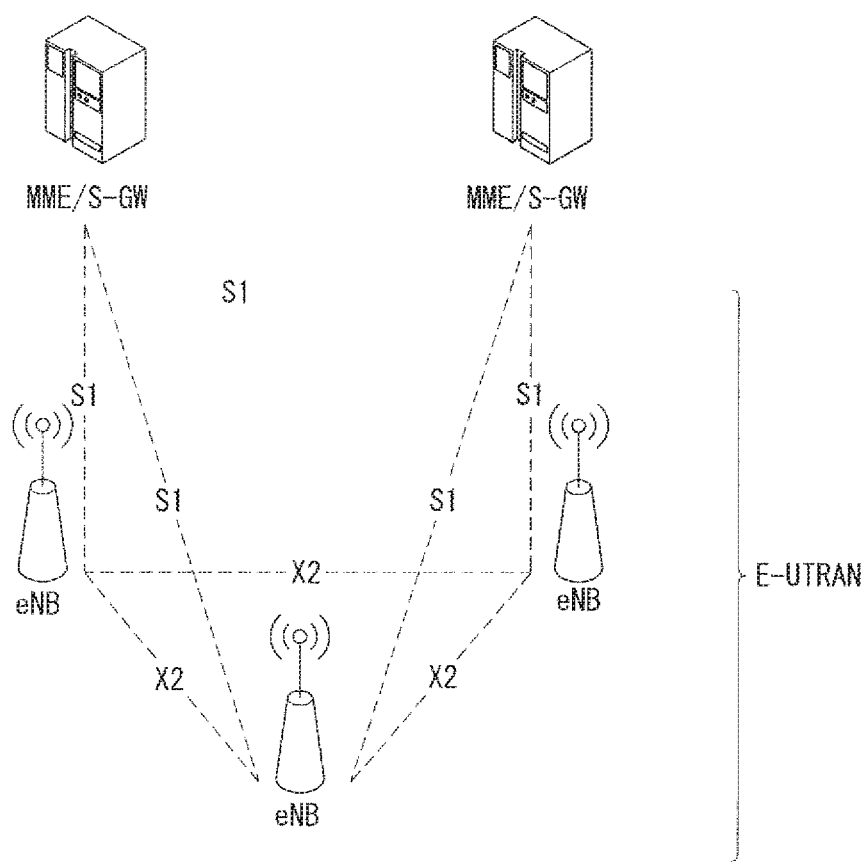

[FIG. 3]
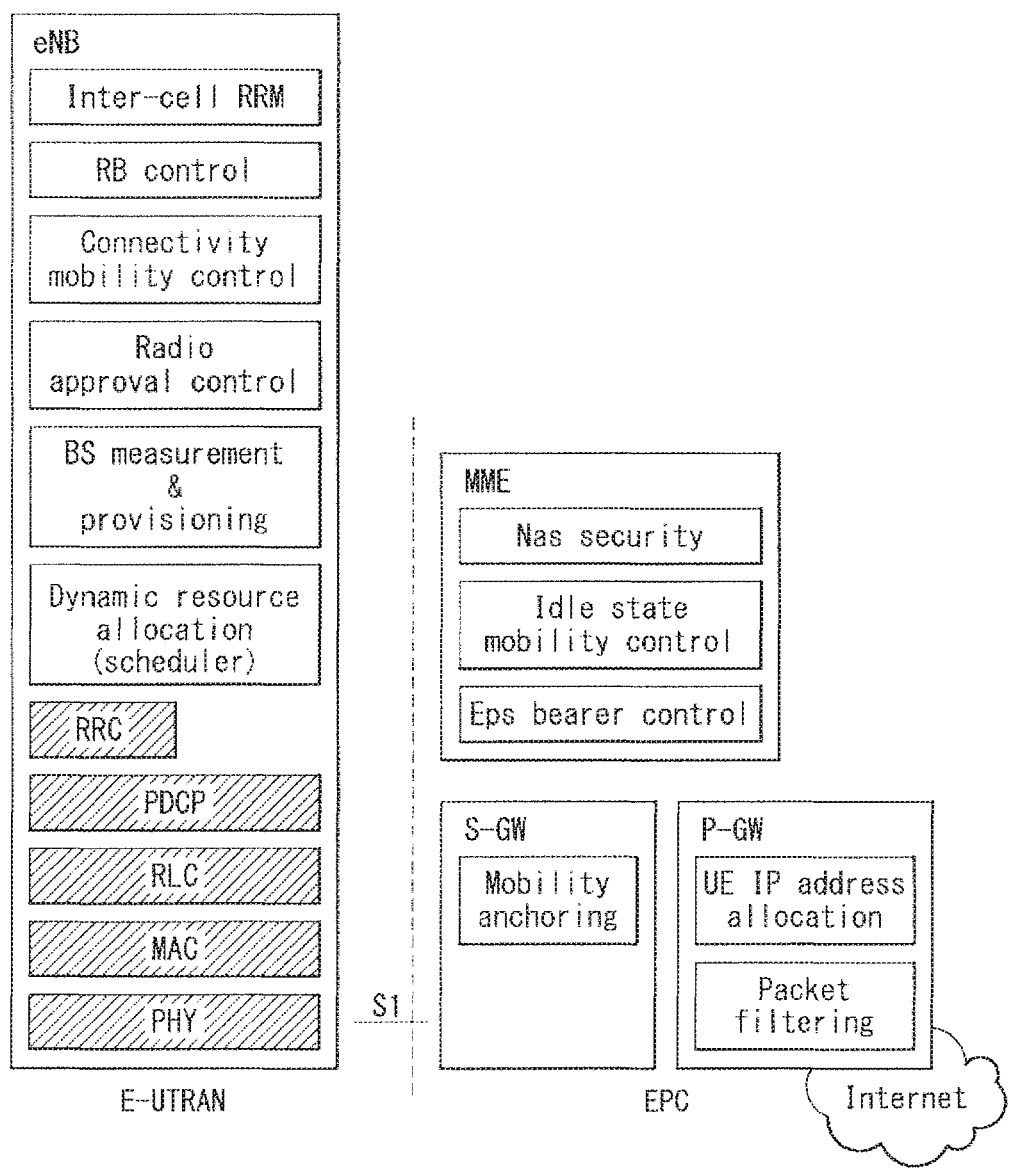

[FIG. 4]
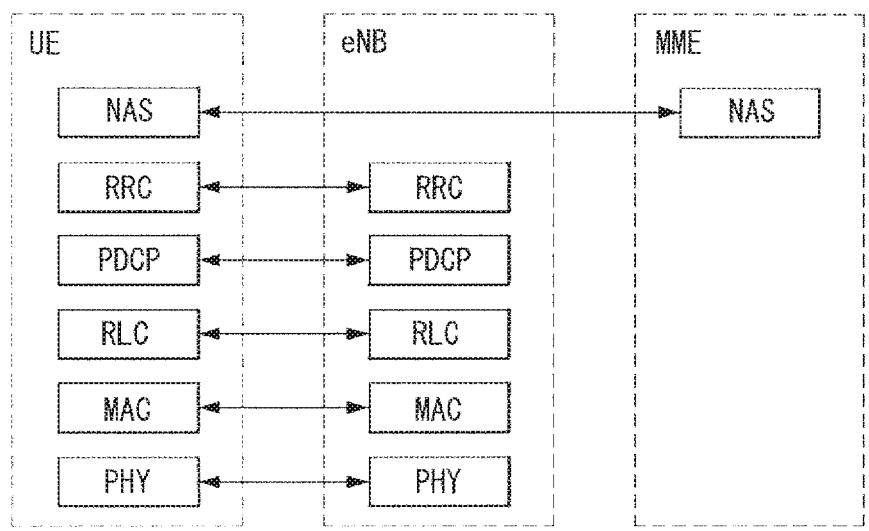
(a) Control plane protocol stack
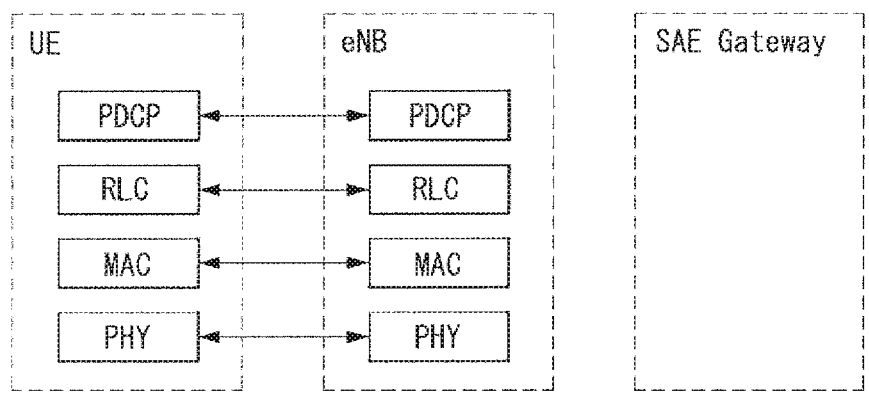
(b) User plane protocol stack

[FIG. 5]
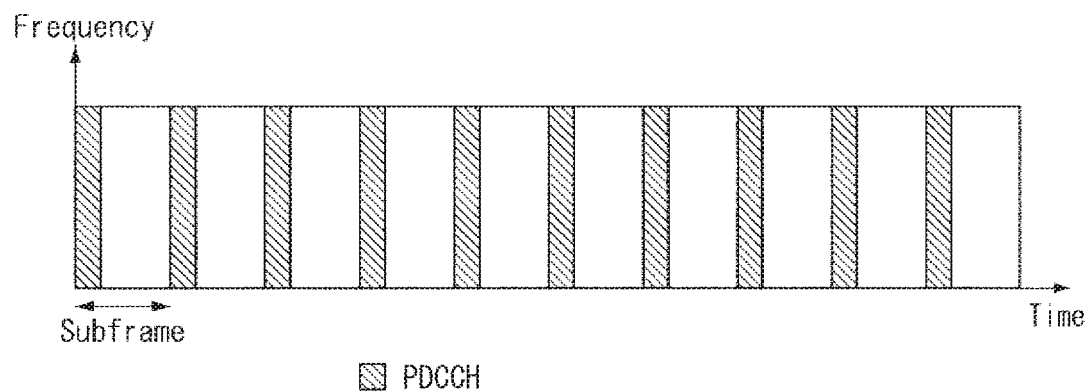
[FIG. 6]
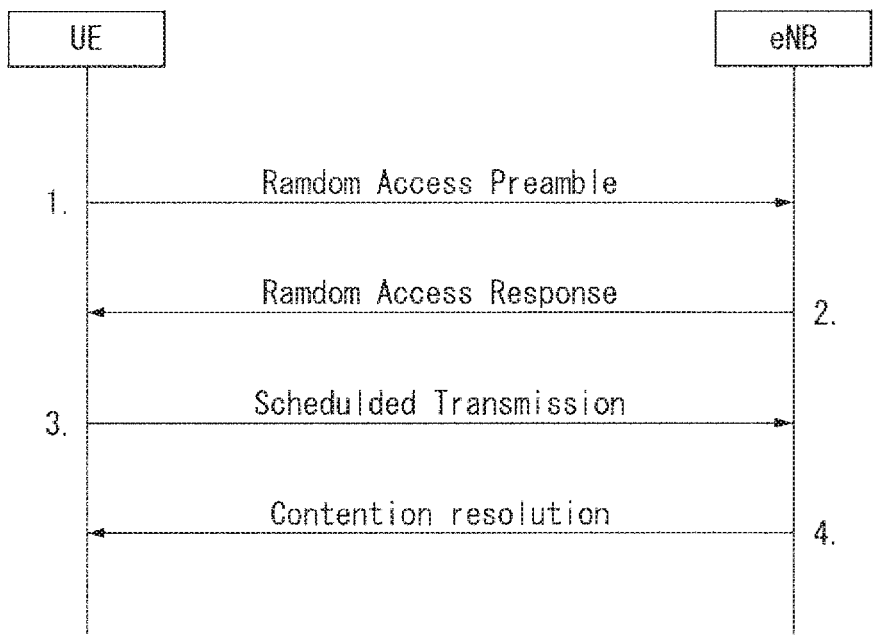

[FIG. 7]
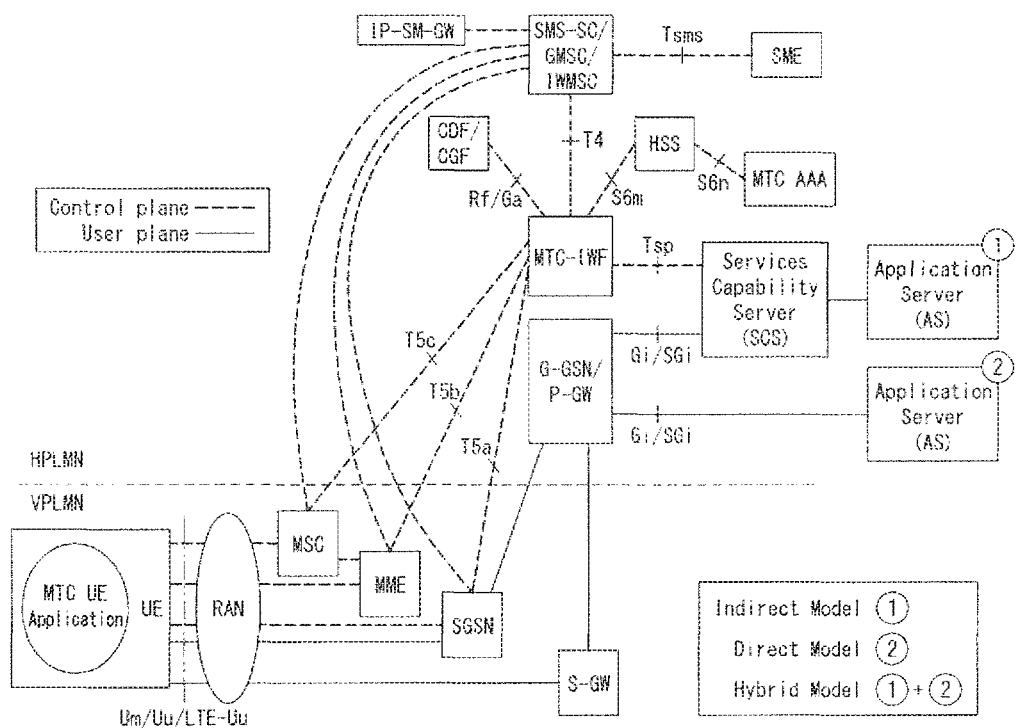

[FIG. 8]
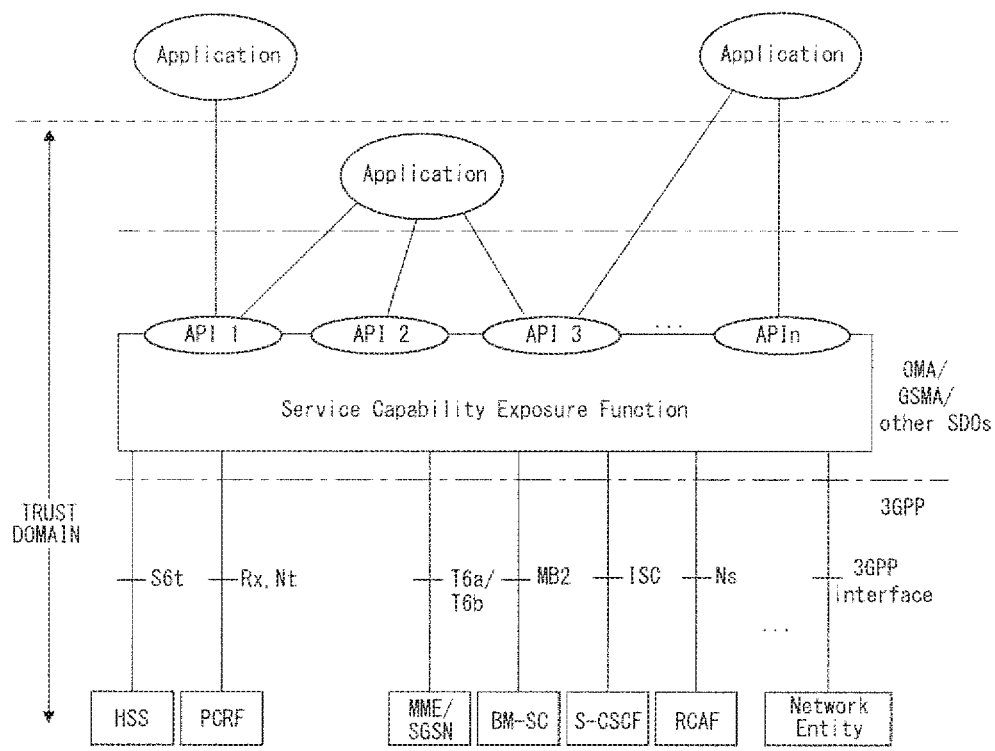

[FIG. 9]
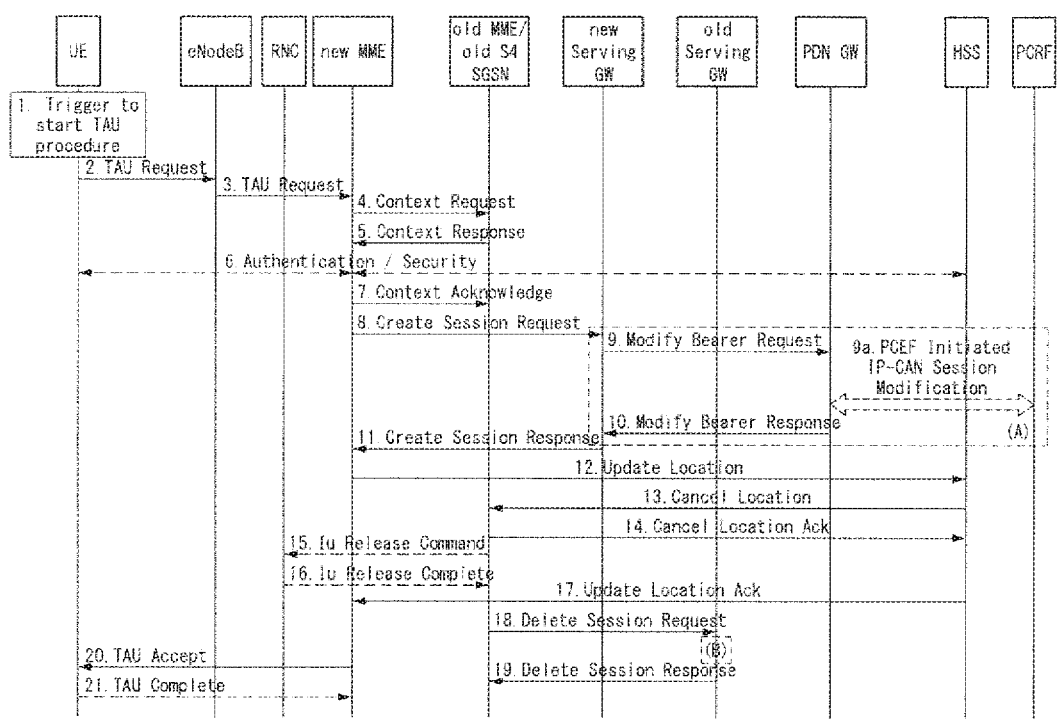

[FIG. 10]
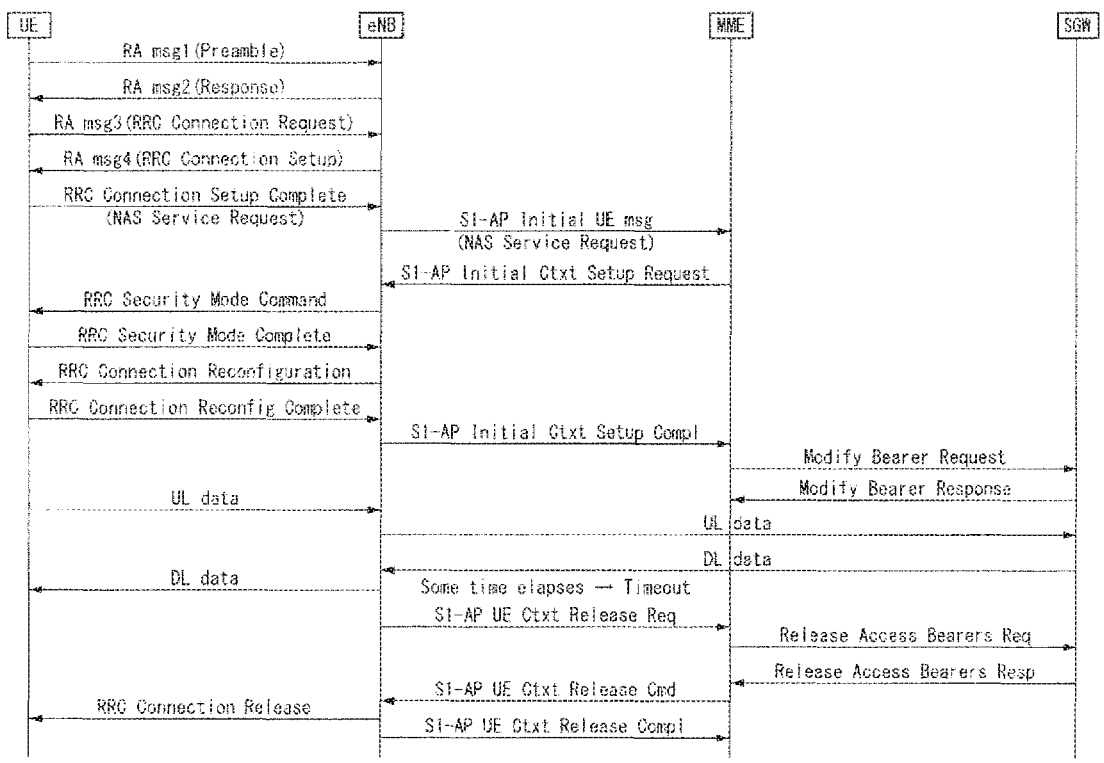

[FIG. 11]
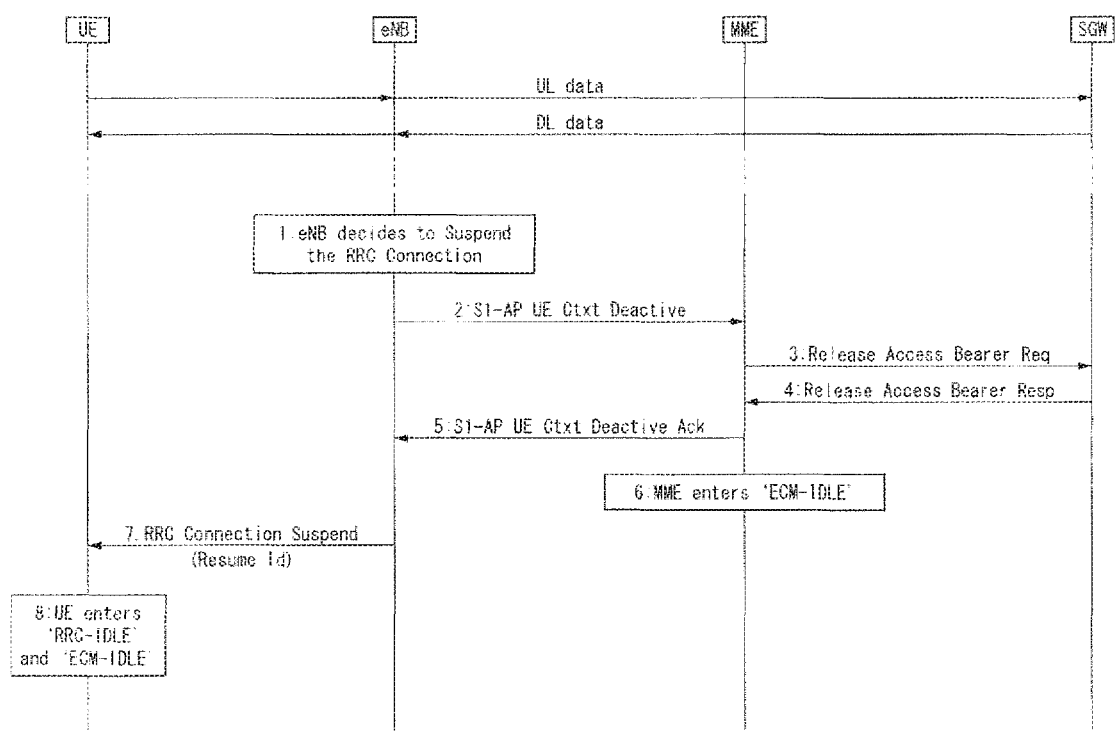

[FIG. 12]
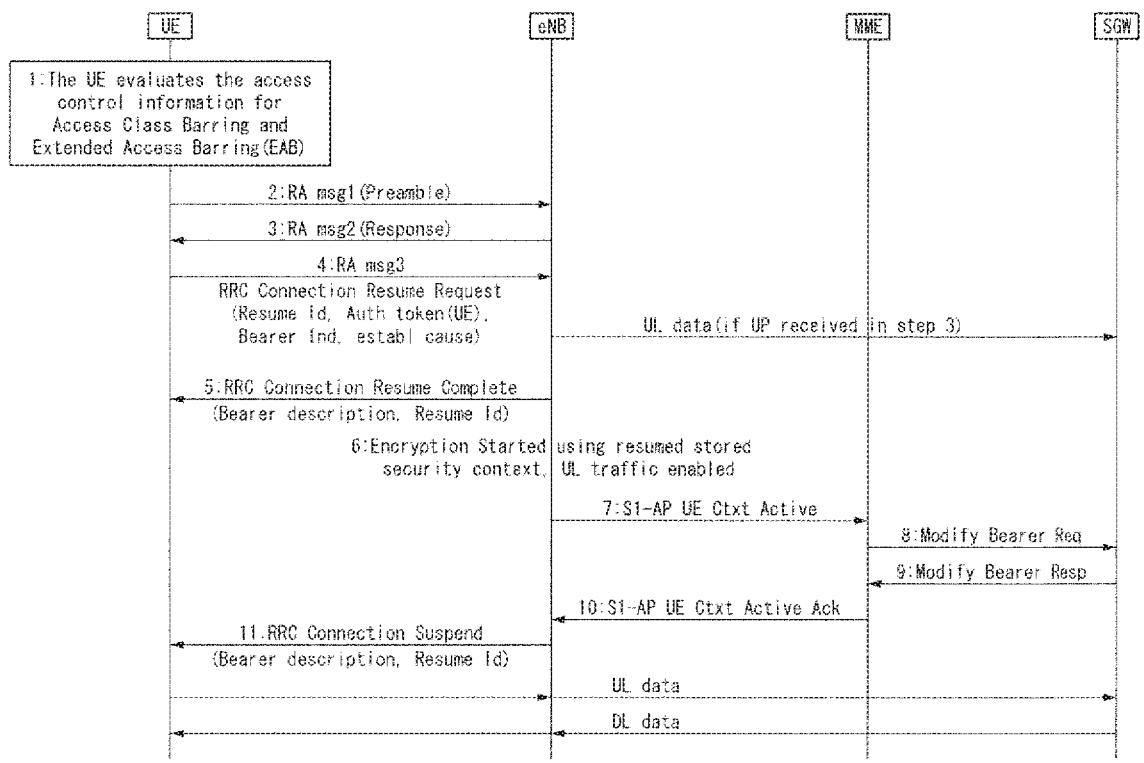

[FIG. 13]
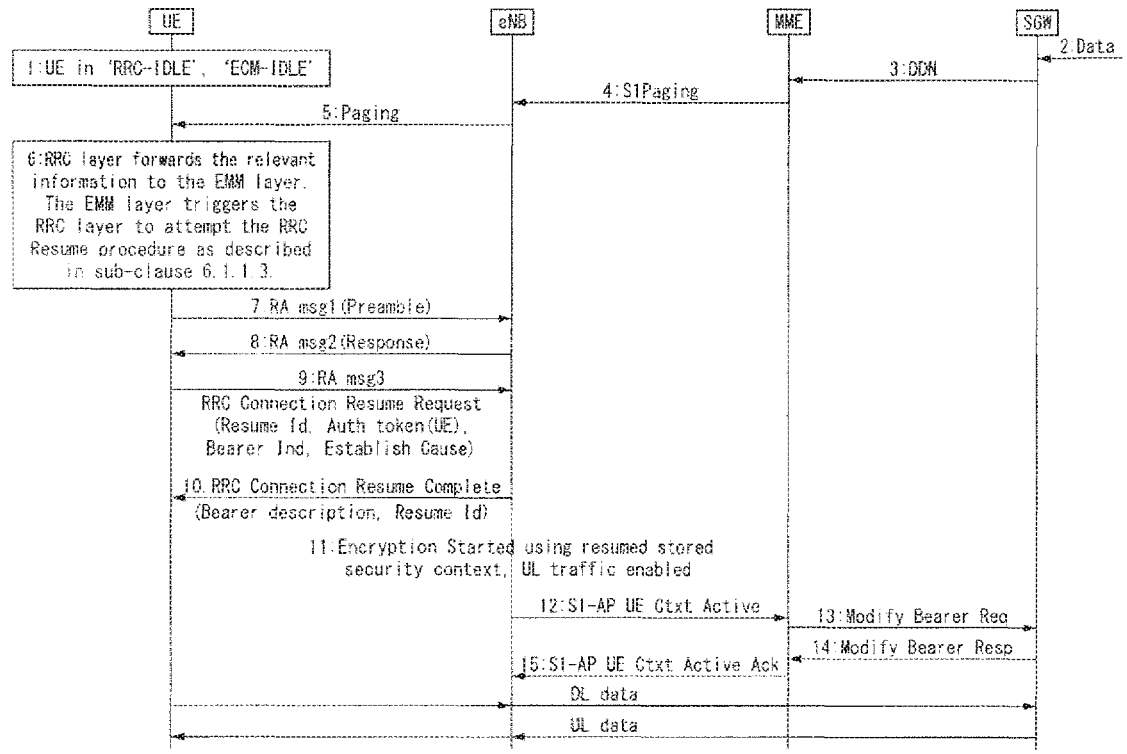

[FIG. 14]
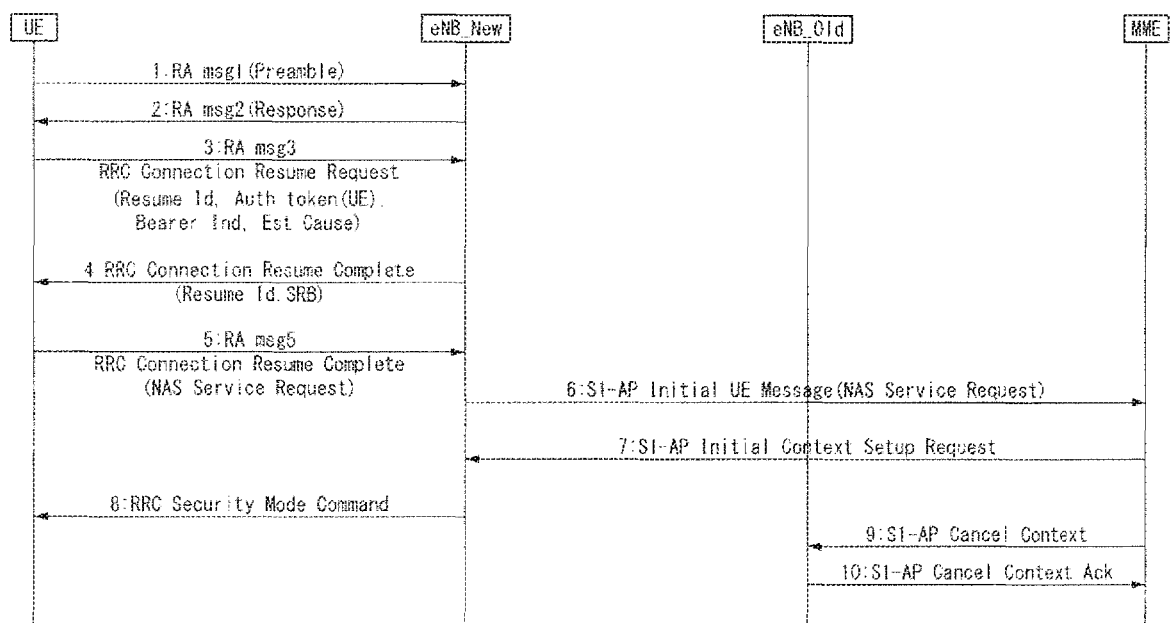

[FIG. 15]
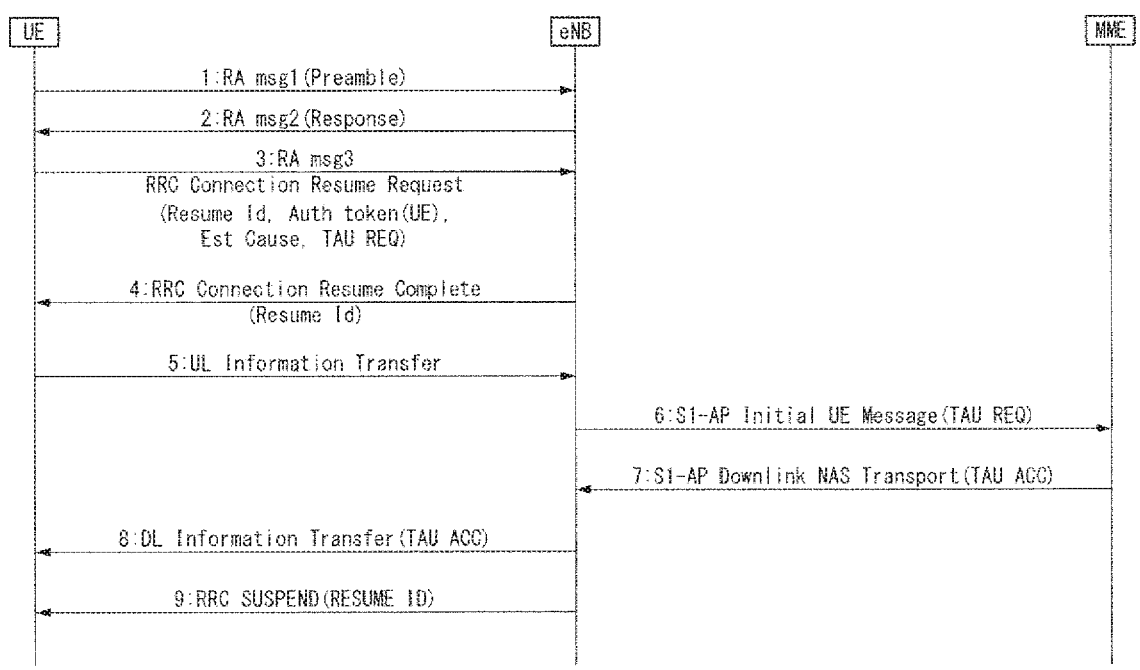

[FIG. 16]

| Octets | Bits 8 | 7 | 6 | 5 | 4 | 3 | 2 | 1 |
|---|---|---|---|---|---|---|---|---|
| 1 | Type = 155 (decimal) ||||||||
| 2 to 3 | Length = n ||||||||
| 4 | Spare |||| Instance ||||
| 5 | Spare | PCI | PL ||| | Spare | PVI |
| 6 to (n+4) | These octet(s) is/are present only if explicitly specified ||||||||

[FIG. 17]
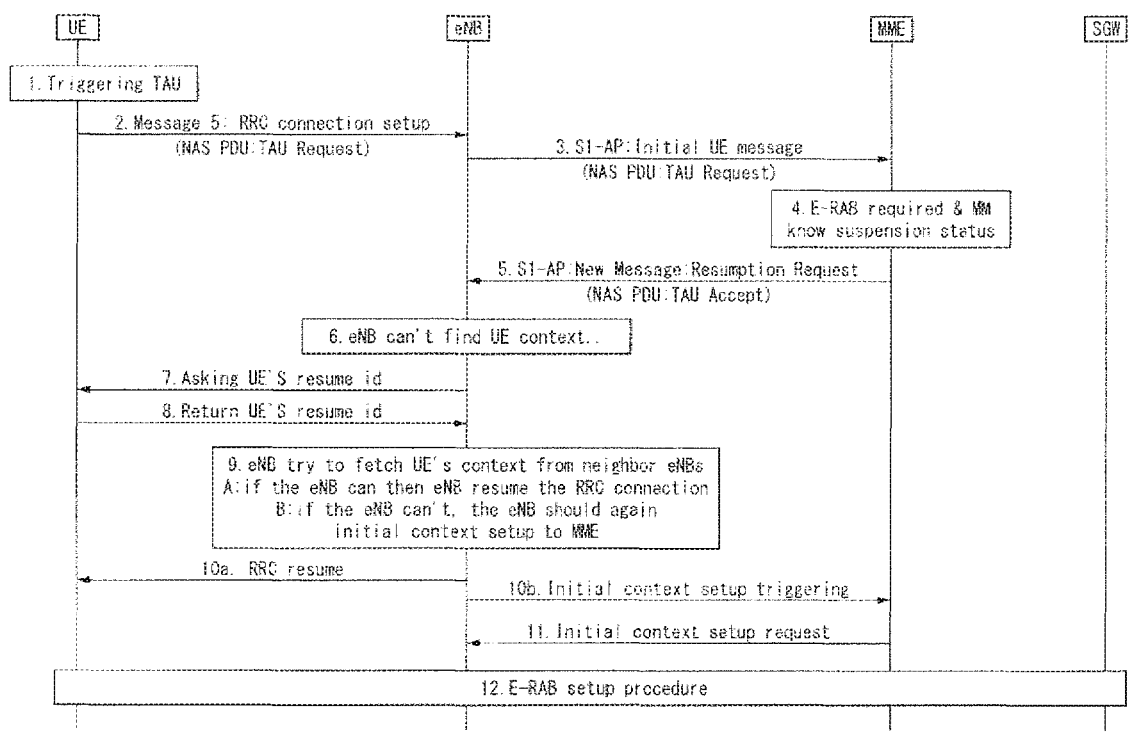

[FIG. 18]
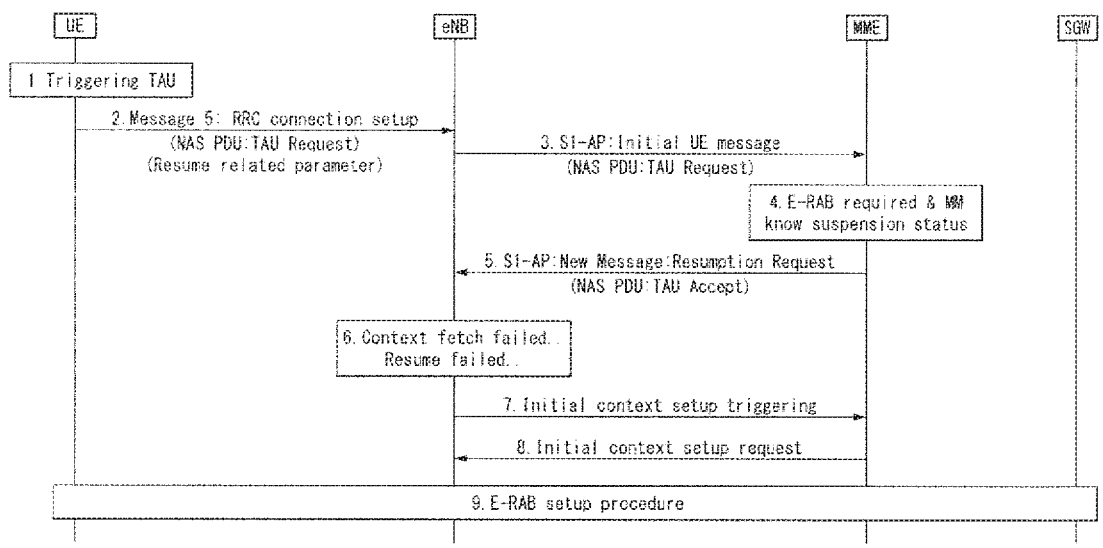

[FIG. 19]
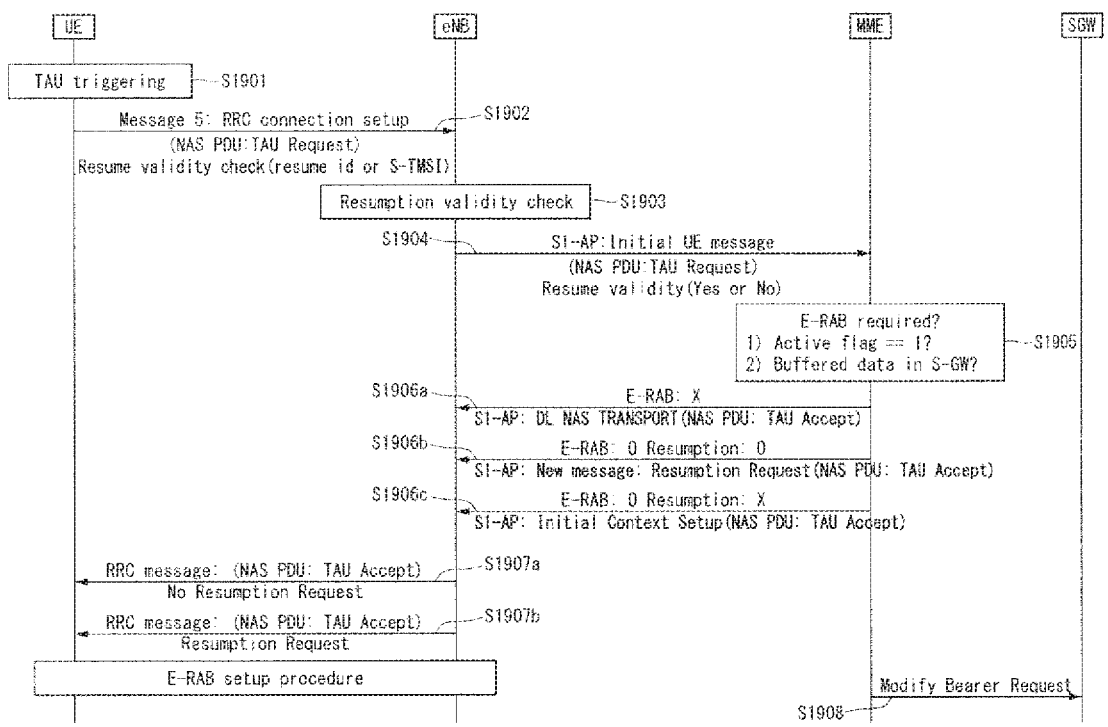

[FIG. 20]
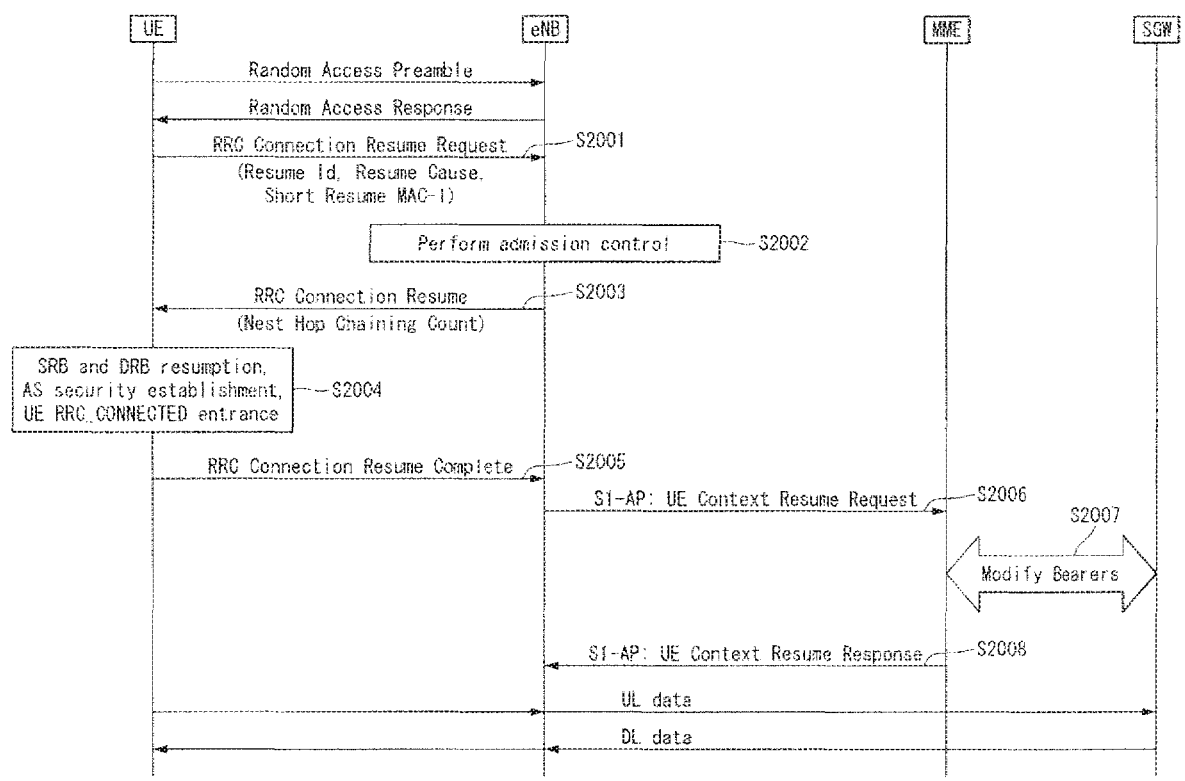

[FIG. 21]
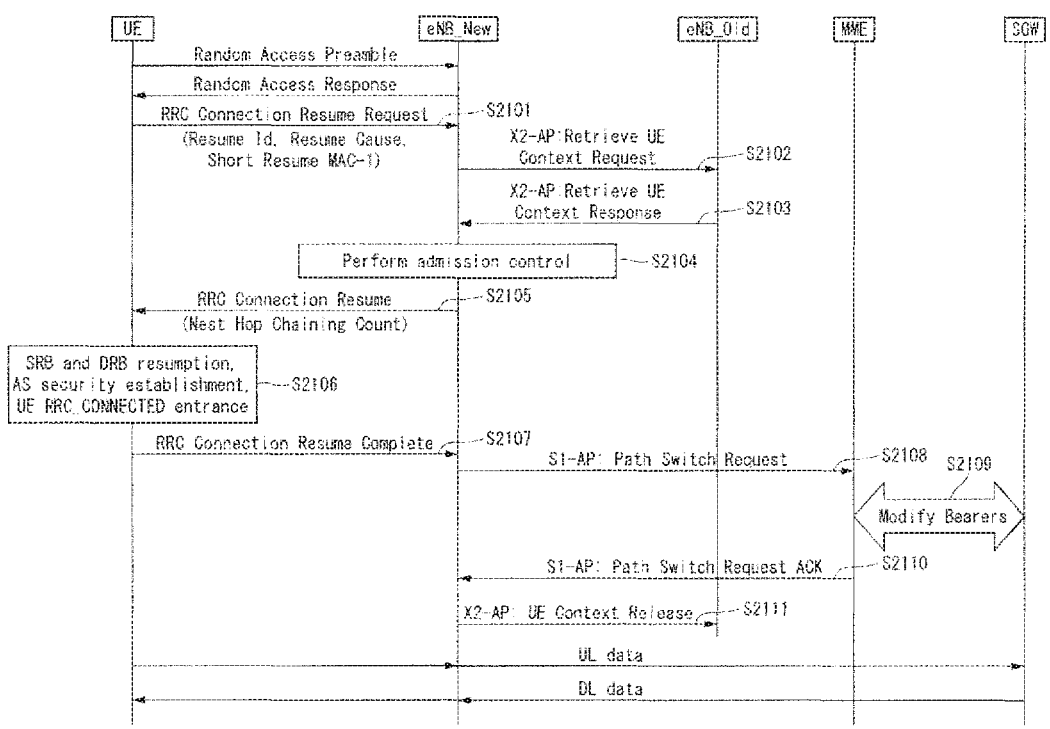

[FIG. 22]
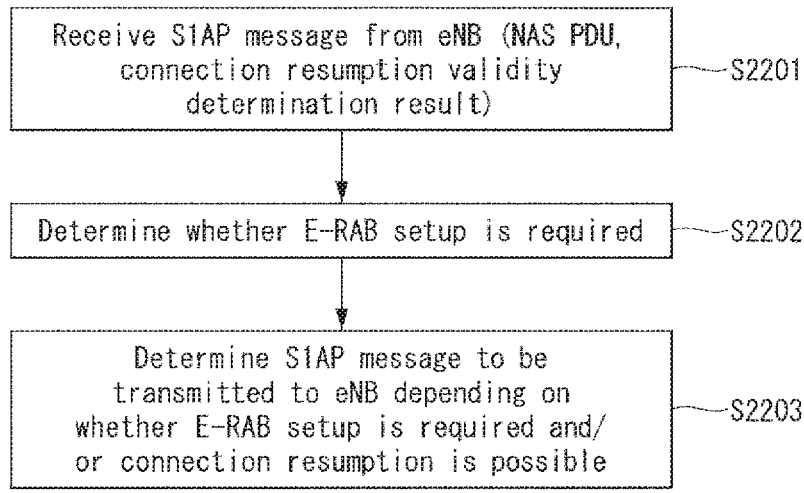
[FIG. 23]
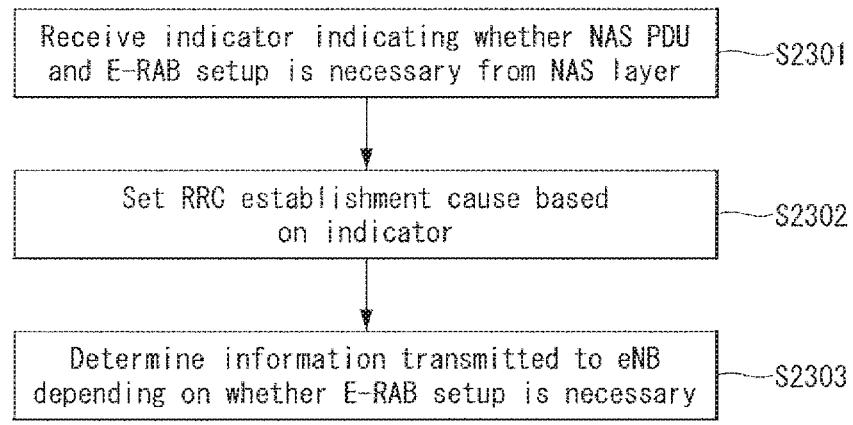

[FIG. 24]
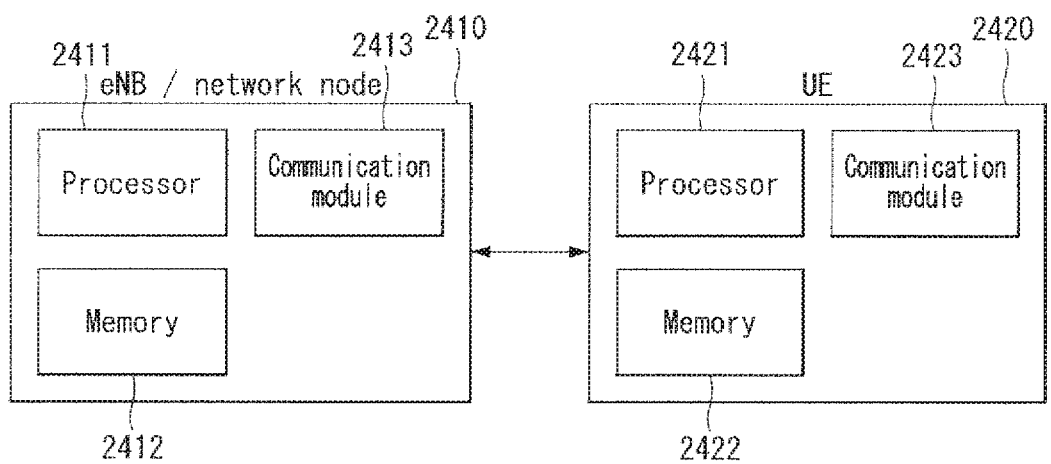

【FIG. 25】
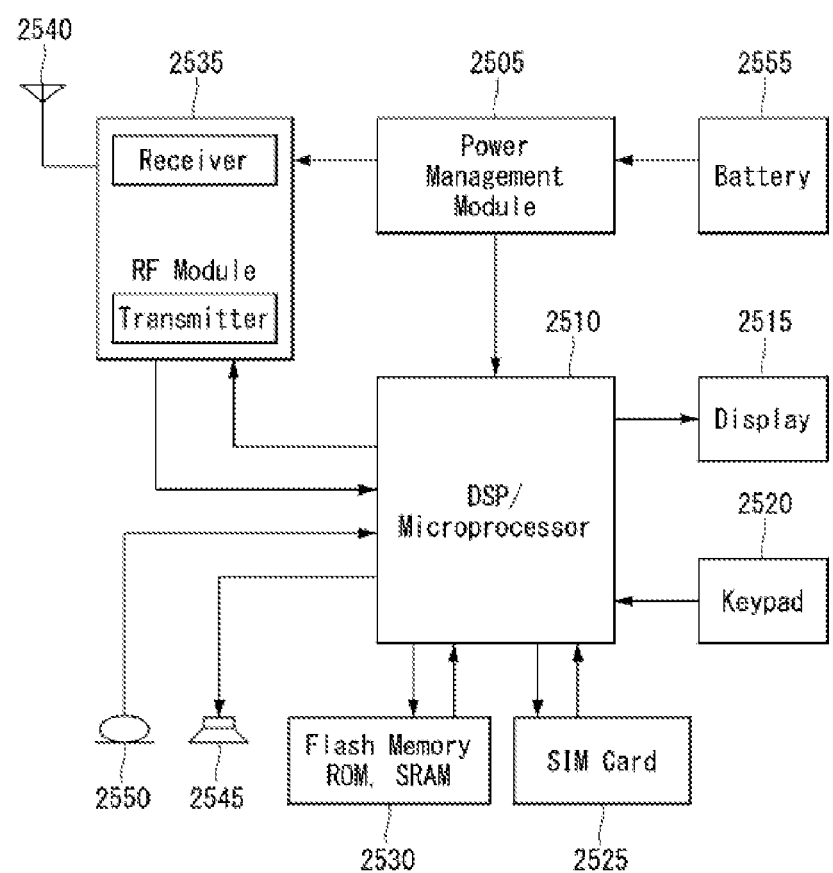

METHOD FOR RESUMING CONNECTION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/000692, filed on Jan. 19, 2017, which claims the benefit of U.S. Provisional Application No. 62/280,130, filed on Jan. 19, 2016, 62/290,968, filed on Feb. 4, 2016, and 62/296,076, filed on Feb. 17, 2016, the contents of which are all hereby incorporated by reference herein in their entirety.

TECHNICAL FIELD

The present invention relates to wireless communication system, and more particularly, to a method for performing/supporting a connection resumption procedure and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.
[Disclosure]

Technical Problem

It is an object of the present invention to provide a method for performing a connection resume procedure for transferring user plane data within a user equipment (UE) and a serving base station without using a service request in order to establish an access stratum (AS) context.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to an aspect of the present invention, there is provided a method for performing a connection resumption procedure by a network node in a wireless communication system, including: receiving a message including a tracking area update request (TAU request) of a user equipment (UE) from an eNodeB (eNB), wherein the message includes a result of determining a validity on whether connection resumption of the UE is possible by the eNB; determining if an E-RAB (E-UTRAN Radio Access Bearer) setup for the UE is required; and determining a message to be transmitted to the eNB depending on whether the E-RAB setup for the UE is required and/or whether the connection resumption of the UE is possible.

Preferably, it may be determined that the E-RAB setup is required if an active flag is set in the TAU request and/or if an extended buffering is applied by a serving gateway (S-GW) and downlink data for the UE is waiting in the S-GW.

Preferably, the method may further include transmitting, to the eNB, a downlink NAS TRANSPORT message including a TAU Accept in order to transmit only the TAU Accept to the eNB.

Preferably, the method may further include transmitting, to the eNB, a message which includes a TAU Accept and indicates a request of the connection resumption if the E-RAB setup is required and the connection resumption of the UE is possible.

Preferably, the method may further include transmitting, to the eNB, an Initial Context Setup Request message including a TAU Accept in order to request a context setup of the UE to the eNB if the E-RAB setup is required and the connection resumption of the UE is not possible.

According to another aspect of the present invention, there is provided a method for performing a connection resumption procedure by a user equipment (UE) in a wireless communication system, including: receiving, by an Access Stratum (AS) module in the UE, a Tracking Area Update (TAU) message and an indicator indicating whether a E-UTRAN Radio Access Bearer (E-RAB) setup is necessary after a TAU procedure from an Non-Access Stratum (NAS) module in the UE if the TAU is triggered by the NAS module in the UE; setting, by the AS module in the UE, a Radio Resource Control (RRC) establishment cause based on the indicator; and determining information to be transmitted to an eNodeB (eNB) depending on whether the E-RAB setup is necessary after the TAU procedure.

Preferably, the method further may further include transmitting, to the eNB, an RRC Connection Request message including a parameter related with the connection resumption and the establishment cause by the AS module in the UE if the E-RAB setup is necessary after the TAU procedure.

Preferably, the parameter may include one or more of a Resume Identifier, an authentication token, and an indicator for requesting a validity check for whether the connection resumption of the UE is possible by the eNB.

Preferably, the method may further include receiving a RRC message which includes a TAU Accept message and instructs the connection resumption if the connection resumption of the UE is possible by the eNB.

Preferably, the method may further include resuming a Signaling Radio Bearer (SRB) and a Data Radio Bearer (DRB) of the UE, which have been suspended before.

Preferably, the method may further include transmitting, by the AS module in the UE, a RRC Connection Request message including the establishment cause to the eNB if the E-RAB setup is not necessary after the TAU procedure.

Advantageous Effects

According to some embodiments of the present invention, in the case of connection resumption failure, fallback to the existing legacy procedure can be minimized.

Also, according to some embodiments of the present invention, when E-RAB setup is required, signaling can be minimized by using connection resumption.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 is a diagram illustrating a MTC (Machine-Type Communication) architecture in a wireless communication system to which the present invention may be applied.

FIG. 8 a diagram illustrating an architecture for service capability exposure in a wireless communication system to which the present invention may be applied.

FIG. 9 is a diagram illustrating a tracking area update procedure in a wireless communication system to which the present invention may be applied.

FIG. 10 is a diagram illustrating a legacy connection setup procedure in a wireless communication system to which the present invention may be applied.

FIG. 11 is a diagram illustrating a suspension procedure of an RRC connection in a wireless communication system to which the present invention may be applied.

FIG. 12 is a diagram illustrating a procedure for resuming the RRC connection in a wireless communication system to which the present invention may be applied.

FIG. 13 is a diagram illustrating a procedure for resuming an RRC connection in a wireless communication system to which the present invention may be applied.

FIG. 14 is a diagram illustrating an attempt to resume when there is no AS information available in an eNB in a wireless communication system to which the present invention may be applied.

FIG. 15 is a diagram illustrating a mobility management procedure using a user plane in a wireless communication system to which the present invention may be applied.

FIG. 16 is a diagram illustrating Allocation/Retention Priority (ARP) which is quality of service (QoS) information used in connection with admission control in a wireless communication system to which the present invention may be applied.

FIG. 17 is a diagram illustrating a tracking area update procedure in a wireless communication system to which the present invention may be applied.

FIG. 18 is a diagram illustrating a tracking area update procedure in a wireless communication system to which the present invention may be applied.

FIG. 19 is a diagram illustrating a NAS procedure including a resumption validity check according to an embodiment of the present invention.

FIG. 20 is a diagram illustrating an RRC connection resumption procedure according to an embodiment of the present invention.

FIG. 21 is a diagram illustrating an RRC connection resumption procedure according to an embodiment of the present invention.

FIG. 22 is a diagram illustrating a connection resumption method according to an embodiment of the present invention.

FIG. 23 is a diagram illustrating a connection resumption method according to an embodiment of the present invention.

FIG. 24 is a block diagram illustrating a communication apparatus according to an embodiment of the present invention.

FIG. 25 is a block diagram illustrating a communication apparatus according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention may be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PH ICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

MTC (Machine-Type Communication)

FIG. 7 is a diagram illustrating a MTC (Machine-Type Communication) architecture in a wireless communication system to which the present invention may be applied.

An end-to-end application between the UE (or MTC terminal) used for the MTC and the MTC application can utilize the services provided in the 3GPP system and the optional services provided to the MTC server. The 3GPP system can provide transport and communication services (including 3GPP bearer services, IMS and SMS) including various optimizations which facilitate the MTC.

Referring to FIG. 7, the UE used for MTC is connected to a 3GPP network (UTRAN, E-UTRAN, GERAN, I-WLAN, etc.) through the Um/Uu/LTE-Uu interface. The architecture of FIG. 7 includes various MTC models (Direct, Indirect, Hybrid).

First, the entities shown in FIG. 7 will be described.

In FIG. 7, the application server is a server on the network where the MTC application is executed. The technologies for implementing various above-described MTC applications can be applied to the MTC application server, and the detailed description thereof will be omitted here. In FIG. 7, the MTC application server can access the MTC server through the reference point API, and the detailed description thereof will be omitted here. Alternatively, the MTC application server may be collocated with the MTC server.

The MTC server (for example, the SCS server in FIG. 7) is a server on the network that manages the MTC UE and can communicate with UEs and PLMN nodes which are connected to the 3GPP network and used for the MTC.

The MTC-IWF (MTC-InterWorking Function) may manage the interworking between the MTC server and the operator core network, and play the role of a proxy for the MTC operation. In order to support the MTC indirect or hybrid model, the MTC-IWF can relay or interpret the signaling protocol on the reference point Tsp to operate certain functions in the PLMN. The MTC-IWF may perform a function of authenticating the MTC server before establishing communication with the 3GPP network, a function of authenticating the control plane request from the MTC server, various functions related to the trigger instruction described later, etc.

Short Message Service-Service Center (SMS-SC)/Internet Protocol Short Message GateWay (IP-SM-GW) can manage transmission and reception of short message service (SMS). The SMS-SC may be responsible for relaying, storing, and delivering short messages between a Short Message Entity (SME) (the entity transmitting or receiving short messages) and the UE. The IP-SM-GW can be in charge of protocol interoperability between the IP-based UE and the SMS-SC.

Charging Data Function (CDF)/Charging Gateway Function (CGF) can perform charging-related operations.

The HLR/HSS can store subscriber information (IMSI, etc.), routing information, setting information, and provide the MTC-IWF with the stored information.

The MSC/SGSN/MME may perform control functions such as mobility management, authentication and resource allocation for network connection of the UE. The MSC/SGSN/MME may perform a function of receiving a trigger instruction from the MTC-IWF in connection with the triggering to be described later and processing the instruction in the form of a message to be provided to the MTC UE.

The Gateway GPRS Support Node (GGSN)/Serving-Gateway (S-GW)+Packet Date Network-Gateway (P-GW) can function as a gateway which is in charge of connection between the core network and the external network.

Table 2 summarizes the main reference points in FIG. 7.

TABLE 2

| Reference point | Description |
| --- | --- |
| Tsms | A reference point used by an entity outside the 3GPP system to communicate with the MTC UE via SMS |
| Tsp | A reference point used by an entity outside the 3GPP system to communicate with the MTC-IWF in connection with control plane signaling |
| T4 | A reference point used by the MTC-IWF to route the device trigger to the SMS-SC of the HPLMN |
| T5a | A reference point between the MTC-IWF and the serving SGSN |
| T5b | A reference point between the MTC-IWF and the serving MME |
| T5c | A reference point between the MTC-IWF and the serving MSC |
| S6m | A reference point used by the MTC-IWF to inquire the UE's identification information (E.164 Mobile Station International Subscriber Directory Number (MSISDN) or IMSI mapped to an external identifier) and to collect UE accessibility and setting information |

In Table 2, one or more of the reference points T5a, T5b, and T5c is referred to as T5.

On the other hand, user plane communication with the MTC server in the case of the indirect and hybrid models and communication with the MTC application server in the case of the direct and hybrid models can be performed using the existing protocol through the reference points Gi and SGi.

Specific details relating to the contents described with reference to FIG. 7 can be incorporated into this document by referring to the 3GPP TS 23.682 document.

FIG. 8 is a diagram illustrating an architecture for the service capability exposure in a wireless communication system to which the present invention may be applied.

The architecture for the service capability exposure illustrated in FIG. 8 allows the 3GPP network to securely expose its services and capabilities provided by the 3GPP network interface to an external third party service provider application.

The Service Capability Exposure Function (SCEF) is a core entity within the 3GPP architecture for service capability exposure that provides a means for securely exposing services and capabilities provided by 3GPP network interfaces. In other words, the SCEF is a core entity for providing service functions belonging to a trust domain operated by a mobile communication provider. The SCEF provides API interfaces to third party service providers and provides 3GPP service functions to the third party service providers through connections with various entities of the 3GPP. The SCEF function may also be provided by the SCS.

If the Tsp function can be exposed through an application program interface (API), the MTC-IWF can be co-located with the SCEF. A protocol (e.g., DIAMETER, RESTful APIs, XML over HTTP, etc.) for specifying a new 3GPP interface depending on multiple factors is selected. Here, the multiple factors may include easiness of exposure of requested information or the need of a specific interface, but the present invention is not limited to these examples.

The SCEF is an entity that belongs to the Trust Domain and can be operated by a cellular operator or by a third party that has a trusted relationship. As a node for service architecture exposure performed under work items such as MONTE (Monitoring Enhancement) and AESE (Architecture Enhancements for Service Capability Exposure) of 3GPP Release 13, the SCEF is connected to 3GPP entities which is to provide services as in FIG. 8 to thereby provide external third parties with various functions related to monitoring and charging fees and set the communication pattern of the third party providers to the inside of EPS.

Tracking Area Update (TAU) Procedure

The TAU procedure is one of the mobility management procedures performed by the MME and is one of the important functions for managing the mobility of the UE in the EPS.

When a mobility-based TAU may be performed when detecting entry into a new tracking area (TA) that does not exist in the list of TAI (Tracking Area Identity) (i.e., when the tracking area is changed).

Also, a periodic TAU procedure may be performed when a periodic TAU (P-TAU) timer set in the UE expires after the UE enters the idle mode. This periodic TAU may be understood as a method for checking reachability to check whether the UE exists in its network effectively in the network.

FIG. 9 is a diagram illustrating a tracking area update procedure in a wireless communication system to which the present invention may be applied.

FIG. 9 illustrates the TAU procedure in the case that the SGW is changed.

1-3. When the TAU timer of the UE in the ECM-IDLE state expires or the UE moves to another tracking area, the TAU procedure for reporting the tracking area (TA) to the MME is triggered.

The UE initiates the TAU procedure by transmitting a TAU Request message to the MME.

The TAU Request message is included in the RRC Connection Setup Complete message and is then delivered through the RRC Connection Setup Complete message in the RRC connection, and is included in the Initial UE message and is then delivered through the Initial UE message in the S1 signaling connection.

If there is a need for an extended idle mode DRX (eDRX), even though the eDRX parameter has already been negotiated before (e.g., through the previous attachment procedure or previous TAU procedure), the UE enables eDRX parameter information element (IE) to be included in the TAU request message.

4. If the type of the MME having received the TAU Request message is different from that of the old node (i.e., MME or SGSN), the new MME transmits a context request message to the previous MME/SGSN in order to obtain the user information or UE context from the previous MME/SGSN.

5. If the context request message is sent to the previous MME/SGSN, the previous MME/SGSN responds with a context response message. The context response message may include the UE context.

6. The UE and the new MME and the HSS perform authentication function and security (or ciphering) procedures.

The new MME decides whether to relocate the S-GW. When the previous S-GW is no longer able to provide the service to the UE, the S-GW is relocated. In addition, if the new S-GW provides longer service to the UE and/or the UE is expected to be more suitable for the P-GW path, or the new S-GW is co-located with the P-GW, the MME may decide to transfer the S-GW.

7. If the MME selects the new S-GW, the MME transmits a Create Session Request message to the new S-GW selected for each PDN connection.

8. If necessary, the new S-GW transmits a Modify Bearer Request message to the P-GW for each PDN connection.

9a. If necessary, the P-GW may perform PCRF and IP connectivity access network (IP-CAN) session modification procedures.

9. When the P-GW receives a Modify Bearer Request message from the new S-GW, the P-GW transmits the Modify Bearer Response message to the new S-GW in response thereto.

10. The new S-GW updates its bearer context. This allows the new S-GW to route to the P-GW when it receives the bearer PDU from the base station.

The new S-GW transmits a Create Session Response message to the new MME in response to the Create Session Request.

11. The new MME transmits a Context Acknowledge message to the previous MME/SGSN.

When the MME selects the new S-GW, the MME transmits the change indication information of the S-GW to the previous MME/SGSN through the Context Acknowledge message. The change indication information of the S-GW indicates that a new S-GW has been selected.

12. The new MME transmits an Update Location Request message to the HSS.

At this time, the new MME checks whether it has subscription data for the corresponding UE, and can transmit the Update Location Request message to the HSS when there is no subscription data for the corresponding UE.

13. The HSS transmits a Cancel Location message to the previous MME/SGSN.

14. The previous MME/SGSN transmits a Cancel Location Acknowledge message to the HSS in response to the Cancel Location message.

15. If the previous SGSN receives the Context Acknowledge message and the UE is connected via the Iu interface, the previous SGSN transmits an Iu Release Command message to the RNC.

16. The RNC transmits an Iu Release Complete message to the previous SGSN in response to the Iu Release Command message.

17. The HSS transmits an Update Location Acknowledge message to the new MME in response to the Update Location Request message.

The Update Location Acknowledge message may include subscription data for the UE.

18. When the S-GW change instruction is received in the Context Acknowledge message of step 11, the previous MME/SGSN transmits a Delete Session Request message to the previous S-GW to thereby release the MME or SGSN EPS bearer resources.

19. The previous S-GW transmits a Delete Session Response message to the previous MME/SGSN in response to the Delete Session Request message.

20. The new MME transmits a TAU Accept message to the UE. At this time, if a new MME allocates a new Globally Unique Temporary Identity (GUTI) to the UE, the allocated GUTI may be included in the TAU Accept message.

If the UE has included the eDRX parameter(s) information in the TAU Request message and the MME decides to activate the eDRX, the MME enables the eDRX parameter(s) IE to be included in the TAU Accept message.

If the TAU Accept message is received and the ISR Activated indication does not exist in the TAU Accept message, the UE sets the TIN to a Globally Unique Temporary Identity (GUTI).

21. When the GUTI is included in the TAU Accept message, the UE transmits a TAU Complete message to the MME in response to the TAU Accept message.

Solution for CIoT (Cellular Internet of Things) User Plane Optimization

The Cellular Internet of Things (CIoT) defines a new wireless connection suitable for IoT services.

In 3GPP, a method for user plane optimization for supporting cellular IoT is discussed. As part of the discussion, a user plane based solution using AS (Access Stratum) information stored in RAN is as follows.

The main cause of the signaling overhead corresponds to the procedure used in the current S1-based EPS architecture required for UE state transition (i.e., transition between the idle state and the connected state).

FIG. 10 illustrates a legacy connection setup procedure in a wireless communication system to which the present invention may be applied.

FIG. 10 illustrates a current S1/EPS architecture based on a procedure required for connection establishment and tear down so that the UE can perform transmission/reception on the use plane (i.e., a procedure that the UE can be applied to an idle/connected state transition)

As can be seen in FIG. 10, there is considerable signaling overhead in radio/Uu (i.e., the interface between the UE and the eNB) and the S1AP interface (i.e., the interface between the eNB and the MME). In order to reduce the signaling overhead, In order to reduce the associated processing load in the network required by the procedure illustrated in FIG. 10, a solution is proposed based on the re-use of information from a previous RRC connection for the next RRC connection setup.

This function is supported based on eNB. That is, the resumption of the previously suspended connection is limited to the cell(s) set on the eNB for which the connection was previously suspended. However, this solution can be introduced and supported for UEs having transactions over multiple eNBs by introducing clusters of eNBs supporting the UE context delivery between eNBs via X2 interface.

The reduction of the signaling overhead may be realized by introducing the reuse for the following connection setup by the UE of the new type and the corrected UE operation in the new CIoT idle status if related AS information is included when transitioned to the idle triggered by two new procedures to be described later, namely, "RRC Suspend" and "RRC Resume", and RRC suspend procedure.

In this solution, it is assumed that the UE stores relevant AS information when transitioned to the ECM-Idle triggered by the RRC Suspend procedure.

In the description of this solution, the RRC-Idle state is referred to as the new CIoT RRC-Idle state.

1) Initial Connection and AS Context Setup

As shown in FIG. 10, the UE needs to perform an initial connection setup in order to establish a NAS signaling connection and to provide the initial AS context to the UE and the network.

The NAS layer knows that the next service request is not required as long as a valid AS context in the network is discovered by the AS layer. If the AS layer context is lost in the network for any reason while the UE is attempting a resumption procedure, the resumption procedure fails and the AS layer triggers the NAS layer service request in order to establish a new initial AS layer context.

2) RRC Suspend Procedure

The RRC Suspend procedure is used when transitioning from the RRC-Connected state to the RRC-IDLE state and allows the UE to maintain the context in the RRC-IDLE mode:

The eNB and UE store RRC connection related information. For example, an Access Stratum Security Context, bearer-related information (including Robust Header Compression (RoHC) status information), and a second/first layer parameter. The eNB provides the UE with an identifier referred to as a Resume ID (Identifier), which can be used, for example, to identify related information stored in the eNB based on an eNB ID (Identifier).

The associated network node stores the S-MME UE association and the S1-U bearer context related information. This basically means that the S1AP UE context is stored and maintained in the eNB and the MME. Also, the eNB stores and maintains the S1-U tunnel address. The latter can reduce the processing load on the eNB required for establishment of the S1-U bearer.

UE's mobility operation is the same as LTE RRC-Idle state. For example, the UE applies the normal or extended Idle mode Discontinuous Reception (DRX) parameters and performs cell re-selection and the like.

When transitioned to RRC-IDLE, the EMM layer enters the ECM-IDLE state.

FIG. 11 illustrates a Suspension procedure for an RRC connection in a wireless communication system to which the present invention may be applied.

1. The network decides to suspend the RRC connection.

2. The eNB indicates to the MME that the UE's RRC connection has been suspended by a new S1AP message (i.e., S1-AP UE Context Deactivation). The MME and the eNB store the UE context associated and related with S1AP. The MME enters the ECM-IDLE state. The MME stores the downlink (DL) tunnel endpoint identifier (TEID) associated with the UE and the eNB.

3. The MME requests release of all S1-U bearers for the UE by transmitting a Release Access Bearer Request message to the S-GW (an abnormal release of radio link indication or "new cause"). The S-GW assumes that the UE is in the idle state.

4. The S-GW provides a response to step 3 (i.e., Release Access Bearers Resp).

5. The MME transmits an acknowledgment for step 2 (i.e., S1-AP UE Context Deactivation Ack).

6. The MME enters the "ECM-IDLE" state.

7. The eNB suspends the RRC connection to the UE. That is, it transmits an RRC Connection Suspend message to the UE. At this time, an identifier used in the subsequent resumption for the suspended RRC connection may be provided. The UE and the eNB store relevant context information (i.e., RRC configuration, bearer configuration (including RoHC status information), Access Stratum Security Context, second/first layer parameters). This message also includes a security algorithm configuration that can be used in subsequent resumption and a next hop chaining counter (NCC) associated with the K_eNB.

8. The UE RRC layer enters the RRC-IDLE state and stores the associated AS information (see step 7 above). The UE NAS layer enters the ECM-IDLE state and knows that a NAS signaling connection is possible.

3) RRC Resumption Procedure

When transitioning from RRC-IDLE to RRC-CONNECTED, not only in the eNB but also in the UE, previously stored information is used to resume the RRC connection.

The UE provides a previously received 'Resume ID' to be used by the eNB in order to access the stored information required to resume the RRC connection. In addition, the UE provides an authentication token used to securely identify the UE.

The associated network node re-stores/re-uses information related to the S-MME UE S1AP and S1-U bearer context.

A given NAS layer knows that the initial connection has been set up and that a NAS Service Request will not be issued. Therefore, there is no need for a RRC Connection Setup Complete message used to carry the message.

Nine messages are used on the wireless interface for the legacy connection setup illustrated in FIG. 10, but the signaling overhead is reduced to four messages when using the RRC resumption procedure illustrated in FIG. 12 below. The following messages are removed:
RRC Connection Setup Complete
RRC Security Mode Command
RRC Security Mode Complete
RRC Connection Reconfiguration
RRC Connection Reconfiguration Complete FIG. 12 illustrates a procedure for resuming an RRC connection in a wireless communication system to which the present invention may be applied.

Steps 1 to 3 follow the legacy procedure when the UE accesses the network from the RRC Idle state. That is, in step 1, the UE evaluates access control information for access class barring and extended access barring (EAB). In step 2, the UE transmits a random access preamble (RA preamble) to the eNB, and receives a random access response (RA response) from the eNB in step 3.

4. In the third message (msg3), i.e., a new RRC Connection Resume Request message, the UE includes a Resume ID, an Authentication Token, a Bearer Indication (Ind), and an establishment cause. The eNB uses Resume ID to associate the UE with the previously stored UE context. In addition, msg3 also includes a User Plane multiplexed by the MAC according to the existing specification, and the resumed stored security context is used to encrypt the user plane.

Thereafter, if the user plane (UP) is received in step 3, the eNB may transmit UL data to the S-GW.

5. In a fourth message (message 4) designated as RRC Connection Resume Complete, the network indicates which Data Radio Bearer (DRB) is to be resumed and also includes a Resume ID, and includes updated second/first layer parameters, if applicable.

6. The UE and the eNB resume the stored security context. That is, encryption is restarted using the resumed, stored security context. At this time, UL traffic transmission is possible.

7. The eNB informs the MME about the UE step change in the new S1AP message designated as S1-AP context activation (S1-AP UE Ctxt Active). The ECM in the MME enters the ECM-CONNECTED state. The MME identifies to the eNB that the MME has stored for the DL TEID allocated to the UE that the UE has returned.

8. The MME transmits a Modify Bearer Req message (eNB address, S1 TEID for the accepted EPS bearer, Delay Downlink Packet Notification Request, RAT type) to the S-GW for each PDN connection. If the S-GW supports the Modify Access Bearers Request procedure and the S-GW does not need to transmit the signaling to the P-GW, then the MME transmits a Modify Access Bearers Request message (ENB address, TEID for the downlink user plane for the accepted EPS bearer, and Delay Downlink Packet Notification Request) to the S-GW for each UE in order to optimize the signaling. The S-GW can now transmit downlink data to the UE. The S-GW regards the UE to be in a connected state.

9. The S-GW provides a response to step 8 (i.e., Modify Bearer Resp).

10. The MME transmits an acknowledgment (i.e., S1-AP UE Ctxt Active Ack) for step 7.

11. As an alternative to transmission of message 4, if message 3 contains an indication that the user plane and all user planes have been transmitted, then the eNB may suspend the RRC connection and implicitly indicate that the user plane has been received successfully through the RRC connection suspend message.

FIG. 13 illustrates a procedure for resuming an RRC connection in a wireless communication system to which the present invention may be applied.

FIG. 13 illustrates a mobile termination (MT) connection when an RRC connection has been previously suspended. That is, a case, in which the UE is an RRC-IDLE that makes an RRC resumption procedure later as described in the RRC Suspend procedure, is illustrated.

1. UE is "RRC-IDLE" and "ECM-IDLE".
2. The S-GW receives data for the idle UE.
3. The S-GW transmits Downlink Data Notification (DDN) to the MME.
4. The MME transmits an S1-paging message to the eNB(s).
5. The eNB pages to the UE via the wireless interface.
6. The UE RRC layer delivers relevant information to the EMM layer. The EMM layer triggers the RRC layer to attempt an RRC resume procedure.
7. The UE transmits a random access preamble (legacy).
8. The eNB responds with a random access response (legacy).
9. In a third message (msg3) designated as the RRC Connection Resume Request, the UE includes the Resume ID, the Authentication Token, the Bearer Indication (Ind), and the establishment cause. The eNB uses Resume ID to associate the UE with the previously stored UE context.
10.) Within a fourth message (message 4) designated as RRC Connection Resume Complete, the network indicates which data radio bearer (DRB) is resumed, and also includes the Resume ID and, if applicable, includes the updated second/first layer parameters.
11. The UE and the eNB resume the stored security context. That is, encryption is started using the resumed, stored security context. At this time, UL traffic transmission is possible.
12. The eNB informs the MME about the UE step change in the new S1AP message designated as S1-AP context active (S1-AP UE Ctxt Active) indicating a "page response". The ECM in the MME enters the ECM-CONNECTED state. The MME identifies to the eNB that the MME has stored for the DL TEID allocated to the UE that the UE has returned.
13. The MME transmits a Modify Bearer Req message (eNB address, S1 TEID for accepted EPS bearer, Delay Downlink Packet Notification Request, RAT type) to the S-GW for each PDN connection. If the S-GW does not need to transmit signaling to the P-GW, then the MME transmits a Modify Access Bearer Request message (eNB address, TEID for the downlink user plane for the accepted EPS bearer, and Delay Downlink Packet Notification Request) to the S-GW for each UE in order to optimize the signaling. The S-GW can now transmit downlink data to the UE. The S-GW regards the UE to be in a connected state.

14. The S-GW provides a response to step 12 (i.e., a Modify Bearer Resp).

15. The MME acknowledges (i.e., S1-AP UE Ctxt Active Ack) for step 11.

4) Resumption when the AS Information is not Available in the eNB

FIG. 14 illustrates an attempt to resume when there is no AS information available in the eNB in a wireless communication system to which the present invention may be applied.

If the UE attempts to resume the RRC connection and the AS information is not available at the eNB, the UE falls back to the connection setup procedure and transmits a NAS Service Request message.

Hereinafter, it is assumed that the AS information is located in eNB_OLD.

4. If the AS information needed to resume the connection is not available in eNB_New, eNB_New will enable a Signaling Radio Bearer (SRB) indication to be included in msg4 (i.e., RRC Connection Resume Complete).

5. The UE interprets the SRB indication as a request for transmission of a NAS service request. The UE transmits an RRC Connection Setup Complete that includes the NAS service request.

6. The NAS service request is transmitted from the eNB_New to the MME through the S1-AP initial UE message (see FIG. 10 above).

7. The MME transmits an Initial Context Setup Request to eNB_New (see FIG. 10 above).

8. The eNB initiates the procedure for configuring the wireless interface. That is, the eNB transmits an RRC Security Mode Command message to the UE. Only the initial message is illustrated in FIG. 14, and the complete sequence is described above with reference to FIG. 10.

9. The MME cancels the context stored in the eNB_OLD by transmitting a S1AP Cancel Context message to the eNB_OLD.

10. The eNB_OLD deletes the AS information and acknowledges step 9 (i.e., S1AP Cancel Context Ack).

The remaining steps are the same as those of FIG. 10

5) Mobility Management (MM) Procedure using User Plane Based Solution

Hereinafter, a method in which a user plane is applied to a tracking area update (TAU) based on a solution will be described.

FIG. 15 illustrates a mobility management procedure using a user plane in a wireless communication system to which the present invention may be applied.

4. In the msg3 specified as the RRC Connection Resume Request message, the UE includes a resume ID, an authentication token, an establishment cause, and a NAS packet data unit (PDU). The eNB uses Resume ID to associate the UE with the previously stored UE context. In addition, msg3 also includes a NAS PDU containing a TAU request (TAU REQUEST) multiplexed by the MAC according to the existing specification, and the resumed stored security context is used to encrypt the user plane.

The absence of the bearer instruction (Ind) indicates to the eNB that only the SRB is needed. If there is not enough space to include the TAU REQUEST, the flag points to the next message containing the TAU REQUEST in step 5.

5. The network completes the contention resolution within message 4 designated as RRC Connection Resume Complete.

6. Step 5 (i.e., transmission of UL information transfer message) is performed when TAU REQUEST is not set within message 3.

7. The eNB forwards the TAU REQ to the MME within the S1AP initial UE message.

8. The MME transmits a TAU acknowledgment (TAU ACC) within the S1AP Downlink NAS Transport message.

9. The eNB transmits the TAU ACC to the UE within the DL Information Transfer.

10. The eNB suspends the RRC connection by transmitting an RRC suspension message to the UE.

For the solution described above, the effects on the existing network node and the function will be described.

MME: Support for new procedures on S1AP (i.e., the related S1AP procedure triggered by the "RRC Suspend" and "RRC Resume" procedures on the wireless interface). Support for storing UE context information if the RRC connection is suspended and the S1AP association is maintained.

eNB: When the UE moves to the new Cellular Internet of Things (CIoT) RRC-Idle state through the new "RRC Suspend" procedure, the support for storing the UE context together with the related radio interface parameters as well as an S1AP association associated with the parameters. Support for new procedures for suspension/resumption of connections between UEs and eNBs and with UEs as well as between eNBs and MMEs UE: Support for storing the related AS information when the UE enters the new CIoT RRC-IDLE state through the new "RRC Suspend" procedure. Support for the procedure necessary to suspend and resume the RRC connection.

The solution described above reduces the signaling overhead required for the UE state transition from the new CIoT to Connected from 10 messages to 5 messages on the wireless interface and reduces the signaling overhead from 6 messages to 4 messages in S1AP in order to return back to the idle state and for the user plane transaction with the network.

This solution affects the AS and NAS layers.

If the user plane is set to message 3, the signaling is reduced from 10 messages to 4 messages, including an acknowledgment of user plane reception.

As a result, the signaling overhead is reduced, and when the UE is served by a cell which is set in multiple eNBs supporting UE context delivery between eNBs, the UE battery lifespan is improved because of the mobility pattern limited to the cell which set by the eNB.

FIG. 16 illustrates Allocation/Retention Priority (ARP) which is quality of service (QoS) information used in connection with admission control in a wireless communication system to which the present invention may be applied. The bits in the 5 octets are as follows.

i) Bit 1: Pre-Emption Vulnerability (PVI)

Pre-emption-Vulnerability Applicable Access Type (AVP): It indicates whether the resources allocated to the service data flow or bearer may be preempted or allocated to the service data flow or bearer having a high priority level.

Value 0 indicates that the resources allocated to the service data flow or bearer can be pre-empted and assigned to a service data flow or bearer having a higher priority level.

Value 1 indicates that the resources allocated to the service data flow or bearer cannot be pre-empted or assigned to a service data flow or bearer having a higher priority level.

ii) Bits 3 to 6: Priority Level (PL)

Values 1 to 15 are defined, value 1 represents the highest priority level.

The priority level defines the relative importance of resource requests.

The AVP can also be used to determine what existing bearer will be preempted while resources are limited (handover case).

Values 1 to 8 should be allocated only to services authorized to receive prioritized processing within the operator domain. Values 9 to 15 may be allocated to resources authorized for the home network, and thus the UE may be applied during roaming.

Bit 7: Pre-Emption Capability (PCI)

It indicates whether the service data flow or bearer can use resources already allocated to another service data flow having a low priority level.

Value 0 indicates that the service data flow or bearer can take resources that have been allocated to another service data flow or bearer that already has a lower priority level.

Value 1 indicates that the service data flow or bearer cannot take resources that have been allocated to another service data flow or bearer that already has a lower priority level.

Efficient Mobility Management Procedures for User Plane Optimization

The solution described above includes the mobility management (MM) procedure, but the methods for the case that the resumption fails and the case that the setup of the E-RAB (E-UTRAN Radio Access Bearer) is necessary after the TAU procedure have not been defined.

In the resumption (or resume) procedure, when the UE moves, if AS context information in the previous eNB cannot be fetched or the UE moves to a resumption-impossible location due to X2 interface, etc., the resumption failure occurs. In this case, a fallback mechanism may be needed to perform the RRC connection setup procedure again.

If the E-RAB setup is not required, the procedure for transmitting the existing NAS PDU instead of the resumption may be performed. On the other hand, if the active flag is set at the TAU, if the active flag is not reachable to the UE which applies the PSM/eDRX in the S-GW, or if data is currently buffered, the DL data transmission may be performed after the MM procedure such as the TAU. That is, the UE may request the setup of the E-RAB at the MME end even if only the MM procedure is started.

More specifically, when CIoT user plane optimization is applied, the problems of the existing procedure when the E-RAB is required to be set after the TAU procedure will be described with reference to the drawings below.

FIG. 17 illustrates a tracking area update procedure in a wireless communication system to which the present invention may be applied.

1. The TAU may be triggered by the NAS layer in the UE (e.g., the NAS module in the processor).

The NAS layer in the UE may provide the purpose (i.e., a call type) of the access control to the AS layer (e.g., the AS module in the processor).

2. The AS layer in the UE may perform the legacy RRC connection setup procedure.

Referring to FIG. 6, the AS layer in the UE may transmit an RRC Connection Request message to the eNB in Message 3 and receive an RRC Connection Setup message from the eNB in Message 4.

At this time, the AS layer in the UE sets the purpose of the access control (i.e., the call type) and a mapped establishment cause provided by the NAS layer, which may be included in the RRC Connection Request message to thereby be transmitted to the eNB.

Further, the AS layer in the UE may enable the NAS PDU (i.e., TAU Request message) to be included in the RRC Connection Setup Complete message to, which is Message 5, to thereby be transmitted to the eNB.

3. The eNB may deliver the NAS PDU to the MME through an Initial UE message which is S1-AP message.

4. The MME can determine whether E-RAB setup is required and the RRC connection is suspended for the UE.

The MME can determine that E-RAB setup is required, for example, when there is DL data to be transmitted to the UE in the S-GW, or when the Active Flag is set to 1.

In addition, when the suspension procedure of the RRC connection is completed as shown in FIG. 11, the MME knows that the RRC connection to the UE is suspended.

In FIG. 17, it is assumed that E-RAB setup is required for the UE and the RRC connection is suspended.

5. The MME may transmit a Resumption Request message, which is a new S1-AP message containing a NAS PDU (i.e., a TAU Accept message), to the eNB.

At this time, the eNB cannot find the UE context. That is, since the Resume ID has not been received from the UE in step 2, the eNB cannot find the UE context.

7-8. Therefore, the eNB inquires the UE about the Resume ID and receives the Resume ID of the UE from the UE.

9. If the serving eNB has the context of the corresponding UE according to the Resume ID of the UE, the serving eNB can perform the RRC Resume procedure with the UE.

On the other hand, if the serving eNB does not have the context of the UE, the serving eNB may perform a procedure for fetching the context of the UE from the neighbor eNBs.

9a-10a. When the serving eNB fetches the UE context from the neighbor eNB, the serving eNB can perform the RRC Resume procedure with the UE. Further, the serving eNB can transmit an RRC Connection Resume message.

9b-10b. On the other hand, when the serving eNB fails to fetch the UE context from the neighbor eNB (for example, when the X2 interface and the neighbor eNB do not exist), the serving eNB performs an initial context setup procedure. That is, the serving eNB may transmit an Initial Context Setup Triggering message to the MME.

11. The eNB may receive an Initial Context Setup Request message from the MME in response to the Initial Context Setup Triggering message.

12. Then, the E-RAB setup procedure can be performed. That is, the eNB may reconfigure the radio bearer for the UE, and an S1-U bearer between the eNB and the S-GW for the UE may be generated.

As shown in FIG. 17, when the TAU procedure is started in the NAS layer of the UE, if the existing RRC Connection Setup procedure is collectively performed by transmitting an RRC Connection Request message to the eNB at the AS layer of the UE, the signaling overhead is increased as the eNB obtains the Resume ID from the UE to perform the RRC Resume procedure and a signaling for obtaining the context of the UE from a neighbor eNB is added. In addition, if the UE context cannot be obtained from the neighbor eNB (i.e., RRC resume is impossible), the above signaling is unnecessary.

In order to solve this problem, a case in which the UE transmits a resume-related parameter to the eNB at the time of RRC Connection Setup in the situation shown in FIG. 17 will be described with reference to the following drawings.

FIG. 18 illustrates a tracking area update procedure in a wireless communication system to which the present invention may be applied.

1. The TAU may be triggered by the NAS layer in the UE (e.g., the NAS module in the processor).

The NAS layer in the UE may provide the purpose (i.e., a call type) of access control to the AS layer (e.g., the AS module in the processor).

2. The AS layer in the UE may perform the legacy RRC connection setup procedure.

Referring to FIG. 6, the AS layer in the UE may transmit an RRC Connection Request message to the eNB in Message 3 and may receive an RRC Connection Setup message from the eNB in Message 4.

At this time, the AS layer in the UE may set the purpose of the access control (i.e., the call type) and a mapped establishment cause which are provided from the NAS layer, and may enable the purpose of the access control and the mapped establishment cause to be included in the RRC Connection Request message to thereby be transmitted to the eNB.

In addition, the AS layer in the UE may include resume-related parameters (i.e., Resume ID, authentication token) in the RRC Connection Request message and transmit the parameters and the RRC Connection Request to the eNB. The authentication token may be used by the eNB to verify the UE identity.

The AS layer in the UE may enable an NAS PDU (i.e., a TAU Request message) to be included in the RRC Connection Setup Complete message, which is Message 5, to thereby be transmitted to the eNB.

3. The eNB may forward the NAS PDU to the MME through an Initial UE message which is S1-AP message.

4. The MME can determine whether E-RAB setup is required and the RRC connection is suspended for that UE.

The MME can determine that E-RAB setup is required, for example, when there is DL data to be transmitted to the UE in the S-GW, or when the Active Flag is set to 1.

In addition, when the suspension procedure of the RRC connection as shown in FIG. 11 is completed, the MME knows that the RRC connection to the UE has been suspended.

In FIG. 18, it is assumed that E-RAB setup is requested for the corresponding UE and the RRC connection is suspended.

5. The MME may transmit a Resumption Request message to the eNB which is a new S1-AP message containing a NAS PDU (i.e., a TAU Accept message).

6-8. If the serving eNB has the context of the corresponding UE according to the Resume ID of the corresponding UE, it can perform the RRC Resume procedure with the UE.

On the other hand, if the serving eNB does not have the context of the UE, the serving eNB may perform a procedure for fetching the context of the UE from the neighbor eNBs. However, as shown in FIG. 17, when the serving eNB fails to fetch the UE context from the neighbor eNB (for example, when the X2 interface and the neighbor eNB do not exist), the serving eNB performs an Initial Context Setup procedure.

That is, the serving eNB may transmit an Initial Context Setup Triggering message to the MME.

The eNB may receive an Initial Context Setup Request message from the MME in response to the Initial Context Setup Triggering message.

9. Then, the E-RAB setup procedure can be performed. That is, the eNB may reconfigure the radio bearer for the UE, and an S1-U bearer between the eNB and the S-GW for the UE may be generated.

As shown in FIG. 18, when the serving eNB finally fails to fetch the context of the UE from the neighbor eNB (that is, when the RRC resume is impossible), unnecessary additional signaling such as steps 5 and 7 occurs. In addition, since it is not possible to judge the UE about whether the resume is impossible, the resume-related parameters are transmitted in every RRC Connection Setup procedure, thereby wasting radio resources.

In order to solve the above problems, the present invention proposes a method for minimizing the fallback for the resumption failure or a method for minimizing the RRC signaling by utilizing the resume procedure as much as possible when the MME requires E-RAB setup.

In other words, the present invention proposes a method for efficiently performing the MM procedure (e.g., the TAU procedure) when the CIoT user plane optimization is applied, in which the UE resumes the previously stored AS context again at the time of the RRC connection setup instead of deleting/releasing the AS context information during the ECM-Idle/ECM-Connected period.

When CIoT User Plane Optimization is applied and the eNB suspends a previously established RRC connection, if the E-RAB setup is required, the UE performs a Resumption (or Resume) procedure for the next RRC connection setup. If the resumption procedure fails, the UE then performs an RRC connection setup procedure (e.g., a fallback procedure). At this time, the signaling overhead due to the fallback procedure is not clear but is understood as unnecessary resumption causing resumption failure, so it is desirable to prevent the signaling overhead.

As described above, whether or not to perform the resumption procedures for the MM procedure (e.g., TAU) has not yet been clearly defined. In most cases, the MM procedure may not require E-RAB setup, but E-RAB setup is required after a successful MM procedure (e.g., TAU) in the following cases:

Case 1: When the UE NAS indicates that the "active flag" is set

Case 2: If the buffered data for the UE in the S-GW is waiting (i.e., when the S-GW applies extended buffering to the UE)

In both cases, the AS layer of the UE cannot know if an E-RAB setup is necessary. Furthermore, in Case 2, the UE cannot know whether the E-RAB setup is required regardless of the AS layer and the NAS layer of the UE since the E-RAB setup is required due to the DL data transmission. Thus, the AS layer of the UE cannot determine if E-RAB setup is necessary. Thus, only the MME may be optimal for determining the E-RAB setup.

That is, the MME may be an optimal node to determine if the E-RAB setup is required after an MM procedure (e.g., a TAU procedure).

However, when the MME determines that an initial context setup is required, the resumption procedure is an efficient procedure when compared to the entire Initial Context Setup procedure.

That is, if the resumption procedure is available when the MME has decided to set up the E-RAB, the resumption procedure is more efficient than the initial context setup procedure. In other words, as described above, if the resumption procedure is used, such messages as the RRC Connection Setup Complete, the RRC Security Mode Command, the RRC Security Mode Complete, and the RRC Connection Reconfiguration may be omitted, and thus the signaling overhead can be reduced compared to the entire Initial Context Setup procedure.

During the RRC connection setup procedure for the MM procedure, the UE may provide resumption related parameters to the eNB. The eNB may then check the availability of the RRC resumption and indicate to the MME the result of the RRC resumption availability. Based on the eNB evaluation, the MME can select either Initial Context Setup procedure or resumption. If the eNB indicates resumption failure to the MME as the evaluation result, the MME initiates the Initial Context Setup procedure only when E-RAB setup is required. Even if the resumption evaluation fails, there is no impact if the MME does not require E-RAB setup.

Proposal 1) It is possible to allow UE Resumption related information to be included in the RRC message. Thus, the eNB can evaluate resumption availability and indicate the result to the MME. If the MME desires to set up the E-RAB, the MME can determine whether to perform Initial Context Setup or Resumption Request to the eNB based on the resumption evaluation instruction from the eNB.

FIG. 19 illustrates a NAS procedure including a resumption validity check according to an embodiment of the present invention.

FIG. 19 illustrates an overall procedure for the proposed NAS procedure when CIoT User Plane (UP) optimization is applied. It is assumed in FIG. 19 that the TAU procedure is used.

TAU may be triggered by the NAS layer in the UE (e.g., the NAS module in the processor) (S1901).

The NAS layer in the UE may transmit a TAU Request message to the AS layer (e.g., the AS module in the processor) when the TAU is triggered.

At this time, if the E-RAB setup is required after the TAU procedure, the NAS layer can set the active flag in the TAU Request message to Here, when the UE is in the ECM-IDLE state, the Active flag indicates a request by the UE for activation of the radio bearer and the S1 bearer for all active EPS bearers by the TAU procedure.

In addition, the NAS layer in the UE may provide the AS layer with the purpose of access control (i.e., a call type) and/or the RRC establishment cause.

In addition, the NAS layer in the UE may instruct the AS layer to determine whether E-RAB setup is required after the TAU procedure (or whether the RRC connection is resumed).

For example, in the EMD-IDLE (or ECM-IDLE) mode with a suspend indication (i.e., when an indication that an RRC connection has been suspended is received from a lower layer (e.g., AS layer)), if the procedure using the NAS message is triggered, the NAS layer in the UE may request a lower layer (e.g., AS layer) to resume the RRC connection. The NAS layer may provide the RRC establishment cause and/or call type to the lower layer within the request.

The AS layer in the UE may perform an RRC connection setup procedure (S1902).

The AS layer in the UE may set the purpose of access control provided from the NAS layer (i.e., the call type) and the mapped establishment cause.

At this time, if an instruction is given from the NAS layer in the UE that the E-RAB setup is not required after the TAU procedure (i.e., the RRC connection resumption is not requested), the AS layer in the UE may set the RRC establishment cause to "Mobile Originated-signaling(MO-signaling)". Then, the AS layer in the UE can enable "MO-signaling" to be included in the RRC Connection Request message (Message 3) to thereby be transmitted to the eNB. Then, the UE can receive an RRC Connection Setup message from the eNB in Message 4.

On the other hand, if the UE has received an indication from the NAS layer that the E-RAB setup is required after the TAU procedure (i.e., if the RRC connection resumption is requested), the AS layer in the UE may set the RRC establishment cause as "MO-signaling". In this case, if there is an AS context suspended in the UE, the AS layer in the UE may enable an indicator for requesting Resumption Validity in the eNB, resumption related information/parameters (i.e., Resume ID or SAE Temporary Mobile Subscriber Identity (S-TMSI)), an authentication token, an indication that a resumption validity/availability check is required, etc.) and an RRC establishment cause to be included in the RRC Connection Request message (Message 3) to thereby be transmitted to the eNB. Then, the UE can receive an RRC Connection Setup message from the eNB in Message 4.

At this time, the authentication token may be used by the eNB to verify the UE identity.

Further, if the UE receives, from the NAS layer, an indication that the E-RAB setup is necessary after the TAU procedure (i.e., if the RRC connection resumption is requested), the UE may transmit an RRC Connection Resume Request message. At this time, an RRC Connection Resume Request message, an indicator to request resumption validity in the eNB, an indication that resumption related information/parameters and/or resumption validity/availability check is required, and an RRC establishment cause may be included. At this time, the AS layer in the UE may set the RRC establishment cause to "MO-signaling" (or "MO-data").

If the S-TMSI is used as the Resumption ID, the UE may enable only an indicator for requesting the resumption validity check to be included in the RRC Connection Request message.

The AS layer in the UE may transmit the NAS PDU (i.e., TAU Request message) in the RRC Connection Setup Complete message to the eNB as Message 5 after receiving Message 4 from the eNB.

If receiving an indication from the UE that the Resume related information/parameters and/or resume validity check is required in the RRC Connection Request message, the eNB may evaluate/check resumption validity (i.e., availability of resume procedure).

That is, the eNB may evaluate/check whether the valid UE context (including the security context) for that UE can be resumed (i.e., suspended).

The eNB may transmit the NAS PDU to the MME through an initial UE message (S1-AP message) (S1904).

If the resume validity is evaluated/checked in step S1903, the eNB may enable the check result (valid (yes) or invalid (no)) together with the NAS PDU to be included in the Initial UE message to thereby be transmitted to the MME.

At this time, as a result of evaluating/checking the resume validity, if the resume procedure is possible, the eNB may transmit a UE Context Resume Request message to the MME.

The MME may determine whether the E-RAB setup is required (S1905).

If the active flag in the NAS PDU is set and/or extended buffering is applied by the S-GW, and DL data for the UE is waiting in the S-GW, the MME may determine that an E-RAB setup is required for the UE.

Also, the MME may use the result of the resumption validity provided in step S1904. That is, the MME may transmit an Resumption Request or Initial Context setup to the eNB together with the NAS PDU (i.e., the TAU accept message) based on the validity/availability of the resumption.

If the MME determines that the E-RAB setup is not required, a) procedure to be described later may be performed regardless of the resumption validity check result of the eNB.

Alternatively, if the MME determines that E-RAB setup is required, and if it is indicated that resumption is possible within the resumption validity check result received from the eNB, b) procedure described below may be performed.

Or, if the MME determines that the E-RAB setup is required, and if it is indicated that resumption is not possible within the resumption validity check result received from the eNB, then c) procedure may be performed.

a) E-RAB Setup is not Required

The MME may transmit a downlink NAS transport message including an NAS PDU (TAU Accept message) to the eNB (S1906a).

The Downlink NAS transport message is a message which is transmitted to the eNB after the MME enables the NAS message to be included in the Downlink NAS transport message when it is necessary to transparently transmit the NAS message to the UE via the eNB.

The eNB can transparently transmit the NAS PDU to the UE through the RRC message (S1907a). Then, the MME can perform the S1 release procedure.

b) If E-RAB Setup is Required and Resumption is Available

The MME may transmit an S1AP message piggy-backed to the NAS PDU (e.g., a TAU Accept message) to the eNB, indicating that the AS resumption (i.e., connection resumption) is required (S1906b).

At this time, a new S1AP message such as Resumption Request may be used, or a new information element (IE) may be added to the Downlink NAS Transport message.

Alternatively, when the MME receives a UE Context Resume Request message from the eNB by determining that the resume procedure is possible by the eNB, the MME can identify that the UE has returned to the eNB having stored data related to the S1AP association required for resuming the connection, and the UE context and the bearer context (including the downlink TEID). Further, the MME may acknowledge the resumption of the connection to the eNB in the UE Context Resume Response message.

At this time, the MME may not perform the S1 release procedure.

The eNB may transmit the NAS PDU to the UE through the RRC message indicating that the AS context is resumed (i.e., the RRC connection resumption) (S1907b).

For example, the eNB may transmit a Resume Request message to the UE.

Also, at this time, the eNB may determine whether all suspended E-RABs can be admitted (i.e., accept resumption) for the UE.

If the eNB cannot admit all suspended E-RABs for the UE, the eNB may transmit the list of E-RABs which cannot be admitted (E-RABs Failed To Resume List) to the MME through the S1AP message (e.g., a UE context resume request message, etc.). At this time, the E-RABs Failed To Resume List may include an identifier and cause of the E-RAB that cannot admit the resumption (radio resource unavailability, etc.).

At this time, the admission control of the eNB according to the FIG. 20 and FIG. 21 to be described later may be performed.

In addition, the MME may determine whether it is possible to admit all suspended E-RABs for the UE (e.g., if it receives an S1AP message (e.g., a UE context resume request message) from the eNB). Then, if the MME cannot admit all suspended E-RABs for the UE, the MME may transmit the list of the E-RABs that cannot be admitted (E-RABs Failed To Resume List) to the eNB through an S1AP message (e.g., a UE context resume message, etc.). At this time, the E-RABs Failed To Resume List may include the identifier of the E-RAB that cannot admit the resumption and the cause.

At this time, if the UE receives the E-RABs Failed To Resume List from the MME, the eNB can reconfigure the radio bearer for the UE.

When receiving the RRC message indicating the resumption of RRC connection from the eNB, the UE resumes all SRBs and DRBs and re-establishes AS security, and the state of the UE can now be converted to the RRC_CONNECTED state.

c) If E-RAB Setup is Required and Resumption is not Available

The MME may transmit an Initial Context Setup Request message including an NAS PDU (TAU Accept message) to the eNB (S1906c).

The Initial Context Setup Request message is a message through which the MME requests the eNB to set up the UE context.

Then, the eNB may reconfigure the radio bearer for the UE (i.e., the E-RAB setup procedure) (S1907c).

In this case, if an E-RAB setup is required but the resumption result is not received from the eNB, the MME may request an initial context setup.

Also, even if the MME receives a UE Context Resume Request message from the eNB, if it is determined that even 1 E-RAB cannot be resumed due to the determination that the resumption procedure is possible by the eNB, the UE Context Resume Failure message may be transmitted to the eNB in response thereto, thereby releasing the UE-related logical S1-connection. If receiving the UE Context Resume Failure message from the MME, the eNB may release the RRC connection to the UE and release all related signaling and user data transmission resources.

The MME may transmit a Modify Bearer Request message to the S-GW for setting up the E-RAB (S1908).

Then, an S1-U bearer for the UE can be generated as the MME receives a Modify Bearer Response message from the S-GW in response to thereto.

According to another embodiment of the present invention, the eNB may not perform the resumption validity check in step 3 of FIG. 19

The procedure before step S1905 of FIG. 19 may follow the existing TAU procedure (see FIG. 9 above).

If it is determined in step S1905 of FIG. 19 that the MME does not need the E-RAB setup, steps S1906a to S1907a of FIG. 19 may be performed.

On the other hand, if it is determined in step S1905 of FIG. 19 that the MME requires the E-RAB setup, the MME may transmit an initial context setup message to the eNB in step S1906.

When the eNB receives the Initial Context Setup from the MME, it can determine whether or not the RRC connection can be resumed. For example, the eNB can determine whether the AS context of the corresponding UE can be resumed through information such as S-TMSI or C-RNTI received from the UE during RRC Connection Setup.

If it is determined that the RRC connection can be resumed, the eNB may perform the resume procedure. The eNB may then transmit a Resume Complete message (or a UE Context Resume Request message) to the MME.

At this time, it may be implemented as transmitting an initial context setup complete message to the MME, or as a new message requesting the activation of the suspended context.

According to another embodiment of the present invention, in the resume procedure, when the eNB performs admission control in order to allocate resources of DRBs of the AS context of the corresponding UE to be resumed, the admission control needed to reserve DRB resources can be performed differently from the existing operation. That is, the eNB can perform admission control by differently analyzing the Allocation/Retention Priority (ARP) value allocated to the corresponding UE.

Similarly, even in the case of a pure NAS procedure (for example, a TAU procedure), when the AS context is resumed regardless of whether DRB setup is required or not, the eNB may perform the admission control required for reserving the DRB resources of the UE in a manner different from that of the exiting operation.

That is, when the eNB requests the resumption of the corresponding UE and the RRC establishment cause is "MO-signaling", not "MO-data", if the eNB performs admission control to allocate resources of DRBs of the AS context corresponding to the UE, the ARP value assigned to the UE can be interpreted differently to thereby perform the admission control.

FIG. 20 is a diagram illustrating an RRC connection resume procedure according to an embodiment of the present invention.

At an earlier point in time (e.g., if the UE has been paged or new data has arrived in the uplink buffer), the UE may transmit an RRC Connection Resume Request message to the eNB to thereby resume the connection (S2001).

The UE may enable a resume ID, a resume cause, and an authentication token to be included in an RRC Connection Resume Request message. The authentication token may be used by the eNB to verify the UE identity.

The eNB may perform admission control to reserve previously suspended resources (e.g., a bearer) for the UE (S2002).

In this case, the eNB may ignore the PCI value of Bit 7 in the ARP illustrated in FIG. 16 in the case of the resume procedure (or when Resume Cause for the UE is "mo-signalling").

That is, even though the DRB of another UE having a lower priority can be pre-emptied due to the setting (i.e., value 0) of the pre-emption capability of Bit 7 among values illustrated in FIG. 16 in the DRB for the previously suspended UE, in the case of the Resume procedure (or if the Resume Cause for the UE is "mo-signaling"), Bit 7 value (pre-emption capability) may be disregarded.

At this time, if there are insufficient resources to be allocated to the UE for resumption, the eNB preempts the resource (i.e., DRB) of another active UE having a low priority to thereby allocate the resource to the UE, but instead the eNB may not allocate resources from a bearer having a low priority level among the bearers (i.e., previously suspended bearers). That is, the eNB may not admit (i.e., drop) from a bearer with a lower priority level.

In addition, the eNB may check whether a Resume ID (i.e., "resumeIdentity") exists, check whether the authentication token is valid, and then perform the above admission control procedure.

If the resume ID (i.e., "resumeIdentity") exists (and the validity of the authentication token is successfully verified), the eNB may transmit an RRC Connection Resume message to the UE (S2003).

At this time, the RRC Connection Resume message may include a Radio Resource Configuration Dedicated for setting up/modifying the radio bearer to the corresponding UE. The Radio Resource Configuration Dedicated may include radio bearer information allocated (or reserved) to the UE by admission control.

In addition, the RRC Connection Resume message may include a next hop chaining counter (NCC) required to re-establish AS security.

The UE resumes all SRBs and DRBs, re-establishes AS security, and the UE can now transition to the RRC_CONNECTED state (S2004).

The UE may transmit an RRC Connection Resume Complete message confirming that the RRC connection has been successfully resumed to the eNB (S2005).

The eNB may initiate the S1-AP Context Resume procedure by transmitting a UE Context Resume Request message to notify the MME that the UE status has changed (S2006).

The MME may request activation of the S1-U bearer for the UE by transmitting a Modify Bearers Request message to the S-GW (S2007).

The MME may transmit a UE Context Resume Response message to the eNB in response to the UE Context Resume Request message (S2008).

The RRC connection may also be resumed in a new eNB that is different from the connection-suspended old eNB. Connection resumption between eNBs is controlled using context fetching where the new eNB retrieves the UE context from the old eNB via the X2 interface. The new eNB provides the Resume ID used by the old eNB to identify the UE context.

FIG. 21 is a diagram illustrating an RRC connection resume procedure according to an embodiment of the present invention.

At an earlier point in time (for example, if the UE has been paged or new data has arrived in the uplink buffer), the UE may transmit an RRC Connection Resume Request message to the eNB to thereby resume the connection (S2101).

The UE may enable a resume ID, a resume cause, and an authentication token to be included in an RRC Connection Resume Request message. The authentication token may be used by the eNB to verify the UE identity.

The new eNB may find the location of the old eNB using the Resume ID and transmit a Retrieve UE Context Request message, which is an X2-AP interface message, to the old eNB in order to retrieve the UE context from the old eNB (S2102).

The old eNB may transmit the UE context associated with the resume ID to the new eNB through a Retrieve UE Context Response message (S2103).

The eNB may perform admission control in order to reserve the previously suspended resource (e.g., a bearer) for the UE (S2104).

At this time, the eNB may disregard the PCI value of Bit 7 in the ARP illustrated in FIG. 16 when performing the admission control in the case of the Resume procedure (or when the Resume Cause for the UE is "mo-signaling").

That is, even though the DRB of another UE having a lower priority can be pre-emptied due to the setting (i.e., value 0) of the pre-emption capability of Bit 7 among values illustrated in FIG. 16 in the DRB for the previously suspended UE, in the case of the Resume procedure (or if the Resume Cause for the UE is "mo-signaling"), Bit 7 value (pre-emption capability) may be disregarded.

At this time, if there are insufficient resources to be allocated to the UE for resumption, the eNB preempts the resource (i.e., DRB) of another active UE having a low priority to thereby allocate the resource to the UE, but instead the eNB may not allocate resources from a bearer having a low priority level among the bearers (i.e., previously suspended bearers). That is, the eNB may not admit (i.e., drop) from a bearer with a lower priority level.

If 'resumeIdentity' exists and the validity of the authentication token (authentication token) is successfully confirmed, the eNB may transmit an RRC Connection Resume message to the UE (S2105).

At this time, the RRC Connection Resume message may include a Radio Resource Configuration Dedicated for setting up/modifying the radio bearer to the corresponding UE. A Radio Resource Configuration Dedicated may include radio bearer information allocated (or reserved) to the UE by admission control.

In addition, the RRC Connection Resume message may include a next hop chaining counter (NCC) required to reestablish AS security.

The UE resumes all SRBs and DRBs, reestablishes AS security, and the UE can now transition to the RRC_CONNECTED state (S2106).

The UE may transmit an RRC Connection Resume Complete message confirming that the RRC connection has been successfully resumed to the eNB (S2107).

The new eNB establishes a signaling connection associated with the S1 UE to the serving MME and may transmit a Path Switch Request message, which is an S1-AP interface message, to the MME in order to request the MME to resume the UE context (S2108).

The MME may request activation of the S1-U bearer for the UE by transmitting a Modify Bearers Request message to the S-GW and update the downlink path (S2109).

The MME may transmit a Path Switch Request Acknowledgment message to the new eNB in response to the Path Switch Request message (S2110).

After the S1-AP path switch procedure, the new eNB triggers the release of the UE context in the old eNB using the X1-AP UE Context Release procedure (S2111).

FIG. 22 is a diagram illustrating a connection resumption method according to an embodiment of the present invention.

Referring to FIG. 22, a network node (e.g., MME) may include the UE's NAS PDU (e.g., TAU Request) from the eNB and receive the S1AP message including the result of determination on whether the connection resumption of the UE is possible by the eNB (S2201).

The network node may determine whether an E-RAB (E-UTRAN Radio Access Bearer) setup for the UE is required (S2202).

In this case, if the active flag is set in the TAU request and/or the extended buffering is applied by the S-GW and the downlink data for the UE is waiting in the S-GW, it may be determined that the E-RAB setup is required.

The network node may determine a message to be transmitted to the eNB according to whether E-RAB setup for the UE is required and/or whether connection resumption of the UE is possible (S2203).

If the E-RAB setup is not required, the network node may transmit a NAS transmission message (Downlink NAS TRANSPORT), which is a message for delivering only the NAS PDU to the eNB), to the eNB. At this time, the Downlink NAS TRANSPORT message may include a NAS PDU (e.g., TAU Accept).

Also, if the E-RAB setup is required and the UE can resume the connection, the network node may transmit an S1AP message (e.g., a Resume Request message), which indicates the connection resumption request, to the eNB. At this time, the S1AP message may include a NAS PDU (e.g., TAU Accept).

Also, if E-RAB setup is required and the UE cannot resume connection, the network node may transmit an Initial Context Setup Request message for requesting the eNB to setup the context of the UE to the eNB. At this time, the Initial Context Setup Request message may include a NAS PDU (e.g., TAU Accept).

FIG. 23 is a diagram illustrating a connection resuming method according to an embodiment of the present invention.

Referring to FIG. 23, an AS layer in a UE (e.g., an AS module in a UE processor) may receive an indicator indicating whether NAS PDU and E-RAB setup is necessary from the NAS layer in the UE (e.g., NAS module in the UE processor) (S2301).

For example, if the TAU is triggered by the NAS layer in the UE, the AS layer in the UE may receive the TAU Request message and an indicator, which indicates whether the E-RAB setup is required after the TAU procedure, from the NAS layer in the UE.

The AS layer in the UE may set an RRC establishment cause based on the indicator (S2302).

Information to be transmitted to the eNB may be determined depending on whether the E-RAB is necessary (e.g., whether or not the E-RAB setup is required after the TAU procedure) (S2303).

If the E-RAB setup is required (e.g., the E-RAB setup is required after the TAU procedure), an RRC message containing the establishment cause and/or connection resumption related parameters may be transmitted to the eNB. For example, an RRC Connection Request message (or an RRC Connection Resumption Request message) may be used.

At this time, the establishment cause may be set to "MO-signaling" (or "MO-data").

In addition, the connection resumption-related parameter may include at least one of a Resume Identifier, an authentication token, and an indicator for requesting a validity check on whether or not the UE can resume connection by the eNB.

Thereafter, when it is possible to resume the connection of the UE by the eNB, an RRC message (for example, RRC Connection Setup message or Resume Request message), which includes an NAS PDU (for example, a TAU Accept message) and indicates resumption of the connection, may be received. In this case, the Signaling Radio Bearer (SRB) and the Data Radio Bearer (DRB) that were previously suspended by the UE can be resumed.

On the other hand, if the E-RAB setup is not required (e.g., the RAB setup is not required after the TAU procedure), an RRC Connection Request message including the establishment cause may be transmitted to the eNB.

At this time, the establishment cause may be set to "MO-signaling".

Overview of Devices to which the Present Invention can be Applied

FIG. 24 illustrates a block diagram of a communication device according to one embodiment of the present invention.

With reference to FIG. 24, a wireless communication system comprises a network node 2410 and a plurality of UEs 2420.

A network node 2410 comprises a processor 2411, memory 2412, and communication module 2413. The processor 2411 implements proposed functions, processes and/or methods proposed through FIG. 1 to FIG. 23. The processor 2411 can implement layers of wired/wireless interface protocol. The memory 2412, being connected to the processor 2411, stores various types of information for driving the processor 2411. The communication module 2413, being connected to the processor 2411, transmits and/or receives wired/wireless signals. Examples of the network node 2410 include an eNB, MME, HSS, SGW, PGW, application server and so on. In particular, in case the network node 2410 is an eNB, the communication module 2413 can include a Radio Frequency (RF) unit for transmitting/receiving a radio signal.

The UE 2420 comprises a processor 2421, memory 2422, and communication module (or RF unit) 2423. The processor 2421 implements proposed functions, processes and/or methods proposed through FIG. 1 to FIG. 23. The processor 2421 can implement layers of wired/wireless interface protocol. The memory 2422, being connected to the processor 2421, stores various types of information for driving the processor 2421. The communication module 2423, being connected to the processor 2421, transmits and/or receives wired/wireless signals.

The memory 2412, 2422 can be installed inside or outside the processor 2411, 2421 and can be connected to the processor 2411, 2421 through various well-known means. Also, the network node 2410 (in the case of an eNB) and/or the UE 2420 can have a single antenna or multiple antennas.

FIG. 25 illustrates a block diagram of a wireless communication apparatus according to an embodiment of the present invention.

Particularly, in FIG. 25, the UE described above FIG. 24 will be exemplified in more detail.

Referring to FIG. 25, the UE includes a processor (or digital signal processor) 2510, RF module (RF unit) 2535, power management module 2505, antenna 2540, battery 2555, display 2515, keypad 2520, memory 2530, Subscriber Identification Module (SIM) card 2525 (which may be optional), speaker 2545 and microphone 2550. The UE may include a single antenna or multiple antennas.

The processor 2510 may be configured to implement the functions, procedures and/or methods proposed by the present invention as described in FIG. 1-23. Layers of a wireless interface protocol may be implemented by the processor 2510.

The memory 2530 is connected to the processor 2510 and stores information related to operations of the processor 2510. The memory 2530 may be located inside or outside the processor 2510 and may be connected to the processors 2510 through various well-known means.

A user enters instructional information, such as a telephone number, for example, by pushing the buttons of a keypad 2520 or by voice activation using the microphone 2550. The microprocessor 2510 receives and processes the instructional information to perform the appropriate function, such as to dial the telephone number. Operational data may be retrieved from the SIM card 2525 or the memory module 2530 to perform the function. Furthermore, the processor 2510 may display the instructional and operational information on the display 2515 for the user's reference and convenience.

The RF module 2535 is connected to the processor 2510, transmits and/or receives an RF signal. The processor 2510 issues instructional information to the RF module 2535, to initiate communication, for example, transmits radio signals comprising voice communication data. The RF module 2535 comprises a receiver and a transmitter to receive and transmit radio signals. An antenna 2540 facilitates the transmission and reception of radio signals. Upon receiving radio signals, the RF module 2535 may forward and convert the signals to baseband frequency for processing by the processor 2510. The processed signals would be transformed into audible or readable information outputted via the speaker 2545.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for performing a connection resumption procedure by a network node in a wireless communication system, the method comprising:
    receiving, from an eNodeB (eNB), a message including a tracking area update (TAU) request of a user equipment (UE),
    wherein the message includes a result of determining, by the eNB, whether connection resumption of the UE is possible; and
    transmitting, to the eNB, a message determined based on:
        (i) whether to require an E-RAB (E-UTRAN Radio Access Bearer) setup for the UE, and
        (ii) whether the result indicates that the connection resumption is possible.

2. The method of claim 1, wherein whether to require the E-RAB setup for the UE is determined based on at least one of:
    an active flag configured in the TAU request, or
    an extended buffering being applied by a serving gateway (S-GW) and downlink data for the UE waiting in the S-GW.

3. The method of claim 1, wherein, based on the E-RAB setup not being required, the message comprises a downlink NAS TRANSPORT message including a TAU Accept.

4. The method of claim 1, wherein, based on the E-RAB setup being required and the result of determining indicating that the connection resumption is possible, the message comprises a TAU Accept and information for a request for the connection resumption.

5. The method of claim 1, wherein, based on the E-RAB setup being required and the result of determining indicating that the connection resumption is not possible, the message comprises an Initial Context Setup Request message including a TAU Accept.

6. A method for performing a connection resumption procedure by a user equipment (UE) in a wireless communication system, the method comprising:
    when a Tracking Area Update (TAU) procedure is triggered by an Non-Access Stratum (NAS) module in the UE, receiving, by an Access Stratum (AS) module in the UE from the NAS module, a TAU message and an indicator indicating whether a E-UTRAN Radio Access Bearer (E-RAB) setup is necessary after the TAU procedure;
    setting, by the AS module in the UE, a Radio Resource Control (RRC) establishment cause based on the indicator;
    transmitting, to an eNodeB (eNB) by the AS module in the UE, a RRC Connection Request message including information determined based on the indicator indicating whether the E-RAB setup is necessary after the TAU procedure; and
    based on a possibility of the connection resumption of the UE having been determined by the eNB, receiving a RRC message from the eNB, the RRC message including a TAU Accept message and information for the connection resumption.

7. The method of claim 6, wherein, based on the indicator indicating that the E-RAB setup is necessary after the TAU procedure, the RRC Connection Request message includes a parameter related to the connection resumption and the establishment cause.

8. The method of claim 7, wherein the parameter includes one or more of a Resume Identifier, an authentication token, or an indicator for requesting the eNB to determine whether the connection resumption of the UE is possible.

9. The method of claim 6, further comprising:
    resuming at least one of a previously suspended Signaling Radio Bearer (SRB) or a previously suspended Data Radio Bearer (DRB) of the UE.

10. The method of claim 6, wherein, based on the indicator indicating that the E-RAB setup is not necessary after the TAU procedure, the RRC Connection Request message includes the establishment cause.

11. A method for performing a connection resumption procedure by an eNodeB (eNB) in a wireless communication system, the method comprising:
    receiving, from a User Equipment (UE), a RRC Connection Request message including information indicating whether a E-RAB setup is necessary after the TAU procedure;
    in response to the RRC Connection Request message, determining whether the connection resumption of the UE is possible;
    transmitting, to a network side, a first message including a tracking area update (TAU) request of the UE and a result of the determining whether the connection resumption of the UE is possible; and
    receiving, from the network side, a second message determined based on:
        (i) the information indicating whether the E-RAB setup is necessary after the TAU procedure, and
        (ii) the result of the determining whether the connection resumption of the UE is possible.

12. The method of claim 11, further comprising:
    transmitting, to the network side, a list of E-RABs that have failed to resume.

13. The method of claim 11, wherein, based on the information indicating that the E-RAB setup is necessary and the result of the determining indicating that the connection resumption is possible, the second message comprises a TAU Accept and information for a request for the connection resumption.

14. The method of claim 13, further comprising:
    transmitting, to the UE, a RRC message which includes a TAU Accept message and information for the connection resumption, based on the second message.

* * * * *